United States Patent
Kobayashi et al.

(10) Patent No.: US 10,802,688 B2
(45) Date of Patent: Oct. 13, 2020

(54) INFORMATION PROCESSING APPARATUS AND INFORMATION PROCESSING METHOD

(71) Applicant: c/o Sony Interactive Entertainment Inc., Tokyo (JP)

(72) Inventors: Motoki Kobayashi, Tokyo (JP); Yasuhiro Yamanaka, Chiba (JP); Shuji Hiramatsu, Tokyo (JP); Shigeru Enomoto, Kanagawa (JP); Taku Sugawara, Tokyo (JP); Shinji Kimura, Los Angeles, CA (US); Yumiko Tanaka, San Francisco, CA (US); George Arriola, Los Angeles, CA (US); Carsten Schwesig, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/280,587

(22) Filed: Feb. 20, 2019

(65) Prior Publication Data
US 2019/0179517 A1 Jun. 13, 2019

Related U.S. Application Data

(62) Division of application No. 14/765,954, filed as application No. PCT/US2014/016034 on Feb. 12, 2014, now Pat. No. 10,318,124.

(Continued)

(51) Int. Cl.
*G06F 3/0484* (2013.01)
*G06F 3/0482* (2013.01)
(Continued)

(52) U.S. Cl.
CPC .......... *G06F 3/04842* (2013.01); *A63F 13/23* (2014.09); *G06F 3/0482* (2013.01);
(Continued)

(58) Field of Classification Search
CPC .... G06F 3/04817; G06F 8/34; H04N 5/44543
See application file for complete search history.

(56) References Cited

U.S. PATENT DOCUMENTS

| | | |
|---|---|---|
| 7,221,331 B2 | 5/2007 | Bear |
| 8,490,137 B2 | 7/2013 | Lee |

(Continued)

FOREIGN PATENT DOCUMENTS

| | | |
|---|---|---|
| CN | 101470872 A | 7/2009 |
| CN | 102004603 A | 4/2011 |

(Continued)

OTHER PUBLICATIONS

Engadget, "VUDU hits PS3 on Nov. 23, UI overhaul coming mid-December," https://www.engadget.com/2010/11/17/vudu-hits-ps3-on-november-23rd-ui-overhaul-coming-mid-december. Published Nov. 17, 2010.*

(Continued)

*Primary Examiner* — Reginald A Renwick
(74) *Attorney, Agent, or Firm* — Matthew B. Dernier, Esq.

(57) ABSTRACT

A screen generating unit generates a home screen for allowing a user to select a desired item of content from among multiple items of content, and the home screen includes a list in which multiple icons representing the multiple items of content are arranged. A display control unit displays the home screen on a television monitor. The screen generating unit further arranges, in the list on the home screen, a search icon used to search for an item of content.

10 Claims, 15 Drawing Sheets

Related U.S. Application Data

(60) Provisional application No. 61/766,223, filed on Feb. 19, 2013.

(51) Int. Cl.
*G06F 3/0481* (2013.01)
*A63F 13/23* (2014.01)
*G06F 3/0489* (2013.01)

(52) U.S. Cl.
CPC ........ *G06F 3/0489* (2013.01); *G06F 3/04817* (2013.01); *G06F 2203/04803* (2013.01)

(56) References Cited

U.S. PATENT DOCUMENTS

| | | |
|---|---|---|
| 8,656,304 B2 | 2/2014 | Tsuda |
| 8,700,478 B2 | 4/2014 | Kubo |
| 2001/0027482 A1 | 10/2001 | Ono et al. |
| 2001/0030666 A1 | 10/2001 | Okada |
| 2006/0007051 A1 | 1/2006 | Bear |
| 2007/0038946 A1 | 2/2007 | Grieshaber et al. |
| 2007/0160345 A1 | 7/2007 | Sakai |
| 2007/0195007 A1 | 8/2007 | Bear et al. |
| 2008/0201667 A1 | 8/2008 | Drayer |
| 2010/0073610 A1 | 3/2010 | Fukuda |
| 2010/0107150 A1 | 4/2010 | Kamada |
| 2010/0199180 A1 | 8/2010 | Brichter |
| 2010/0313136 A1 | 12/2010 | Yoshizawa |
| 2011/0055763 A1 | 3/2011 | Utsuki |
| 2011/0252357 A1 | 10/2011 | Chaudhri |
| 2011/0252361 A1 | 10/2011 | Tsuda |
| 2011/0295709 A1 | 12/2011 | Kubo |
| 2011/0302516 A1 | 12/2011 | White |
| 2012/0023425 A1 | 1/2012 | Hackbom et al. |
| 2012/0084732 A1 | 4/2012 | Filippov et al. |
| 2012/0120316 A1 | 5/2012 | Lee |
| 2012/0215616 A1 | 8/2012 | Leach |
| 2012/0249876 A1 | 10/2012 | Nishizawa |
| 2012/0290972 A1 | 11/2012 | Yook |
| 2013/0007665 A1 | 1/2013 | Chaudhri |
| 2013/0038637 A1 | 2/2013 | Yamanaka |
| 2013/0067388 A1 | 3/2013 | Celie |

FOREIGN PATENT DOCUMENTS

| | | |
|---|---|---|
| CN | 102033690 A | 4/2011 |
| CN | 102063253 A | 5/2011 |
| CN | 102469369 A | 5/2012 |
| EP | 1475731 A1 | 11/2004 |
| EP | 2290925 A1 | 3/2011 |
| JP | 2001222548 A | 8/2001 |
| JP | 2001306593 A | 11/2001 |
| JP | 2001312346 A | 11/2001 |
| JP | 2004334876 A | 11/2004 |
| JP | 2005072945 A | 3/2005 |
| JP | 2010067139 A | 3/2010 |
| JP | 2010198426 A | 9/2010 |
| JP | 2011025513 A | 2/2011 |
| JP | 2011123723 A | 6/2011 |
| JP | 2011129164 A | 6/2011 |
| JP | 2011221825 A | 11/2011 |
| JP | 2011250874 A | 12/2011 |
| JP | 2012098873 A | 5/2012 |
| WO | 2008114491 A1 | 9/2008 |
| WO | 2013136394 A1 | 9/2013 |

OTHER PUBLICATIONS

IGN, "New Xbox 360 Dashboard—Netflix Interface," https://www.youtube.com/watch?v=Lc-VivJigyE. Published Sep. 29, 2010.*

Youtube, "New Ps3 Vudu App!!!!" https://www.youtube.com/watch?v=WhJ1NKJvIRk&t=213s. Nov. 29, 2010.*

"Hutu Plus for iOS Updated With Improved AirPlay Mirroring, Retina iPad Graphics" http://www.mactrast.com/2012/05/hulu-plus-for-ios-updated-with-improved-airplay-mirroring-retina-ipad-graphics/. Created May 22, 2012.*

Communication pursuant to Article 94(3) EPC for corresponding EP Application No. 17754018.1, 7 pages, dated Feb. 19, 2019.

Notification of Reason for Refusal for corresponding JP Application No. 2018070863, 7 pages, dated Feb. 5, 2019.

International Search Report for corresponding PCT Application No. PCT/US2014/016034, 5 pages, dated Aug. 27, 2014.

International Preliminary Report on Patentability and Written Opinion for corresponding PCT Application No. PCT/US2014/016034, 9 pages, dated Sep. 3, 2015.

Office Action corresponding JP Application No. 2015-538167, 11 pages, dated Mar. 22, 2016.

ASCII.jp: Complete showdown in 15 items—Panasonic vs. Sony BD recorder climactic fight (4/6) "DIGA" by Panasonic vs. "BDZ" by Sony, best-of-ten competition by latest BD recorders in fall, Japan, 10 pages, retrieved Oct. 7 30, 2012, from URL, http://ascii.jp/elem/000/000/739/739872/index-4.html (for relevancy see Office Action corresponding JP Application No. 2015-538167, 8 pages, dated Mar. 22, 2016 cited above).

Search Report for corresponding EP Application No. 14754018, 11 pages, dated Sep. 30, 2016.

Office Action for corresponding JP Application No. 2016188249, 14 pages, dated Nov. 7, 2017.

The icons in the home picture are collected in the folder by iPhone, [online], Dec. 14, 2012, 5 pages [search date: Oct. 24, 2017], URL, http://web.archive.org/web/20121214135530/http://www.ipodwave.com/iphone/howto/home-icons-folder.html (For relevancy see Office Action for corresponding JP Application No. 2016188249, 14 pages, dated Nov. 7, 2017 cited above).

Naoki Nozawa, iPhone 4S Perfect Manual first edition, Sotechsha Co. Ltd., Junichi Yanagisawa, first edition, 5 pages, Apr. 20, 2012 (For relevancy see Office Action for corresponding JP Application No. 2016188249, 14 pages, dated Nov. 7, 2017 cited above).

Office Action for corresponding CN Application No. 201480008466.4, 43 pages, dated Jan. 2, 2018.

Office Action for corresponding U.S. Appl. No. 14/765,954, 9 pages, dated Dec. 29, 2017.

Windows. "How to sort your desktop icons by Date modified in Windows 7," https://www.youtube.com/watch?v=m9EhwriUOds. 3 pages, dated Aug. 12, 2009.

Hulu Plus Selection Screen. Burgess, "REVIEWS Hulu Plus for Apple TV Now Available." https://www.groovypost.com/reviews/hulu-plus-apple-tv/. 6 pages, dated Aug. 1, 2012.

Hulu Plus. "Hutu Plus for iOS Updated With Improved AirPlay Mirroring, Retina iPad Graphics," http://www.mactrast.com/2012/05/hulu-plus-for-ios-updated-with-improved-airplay-mirroring-retina-ipad-graphics/. 5 pages, dated May 22, 2012.

Office Action for corresponding U.S. Appl. No. 14/765,954, 11 pages, dated Jul. 26, 2018.

Netflix GUI on PS3, https://www.youtube.com/watch?v=w54vwM7ojEo, 1 pages, published on Nov. 9, 2010.

Office Action for corresponding CN Application No. 201480008466.4, 37 pages, dated Aug. 16, 2018.

Communication pursuant to Article 94(3) EPC for corresponding EP Application No. 14754018.1, 7 pages, dated Feb. 19, 2019.

First Office Action for corresponding CN Application No. 201910248621.4, 19 pages, dated Mar. 30, 2020.

* cited by examiner

INFORMATION PROCESSING APPARATUS AND INFORMATION PROCESSING METHOD

CROSS REFERENCE TO RELATED APPLICATIONS

This is a divisional application of U.S. patent application Ser. No. 14/765,954, accorded a filing date of Aug. 5, 2015, which claims priority to PCT Application No.: PCT/US2014/016034, accorded a filing date of Feb. 12, 2014, which claims the benefit of U.S. Provisional Patent Application No. 61/766,223, accorded a filing date of Feb. 19, 2013, the entire disclosures of which are hereby incorporated by reference.

TECHNICAL FIELD

The present invention relates to data processing technology, and more particularly, to information processing apparatuses and information processing methods for displaying a screen relating to electronic content.

BACKGROUND ART

In recent years, so-called digital home appliances have become more diversified. For example, in order to record a TV program, a hard disk recorder, a DVD recorder, or a composite device thereof can be used. Also, with relation to playing back music, the methods thereof have become diversified, such as reproducing compressed data stored in various types of memory cards or hard disks, besides playing back conventional compact disks (CDs).

DISCLOSURE OF INVENTION

Problem(s) to be Solved by the Invention

Digital home appliances, particularly devices for playing electronic content including an image and music are expected to be used by multiple people at the same time. Accordingly, unlike personal computers (PCs), such devices are often placed in a living room or another shared space in a house. Since a control panel or a controller of a digital home appliance is usually designed with fewer buttons and a smaller display area, details of operation are sometimes displayed on an area of another device, such as on a television screen. A television screen is generally viewed at some distance, so that texts in small font sizes or movements of a small pointer, as provided on a PC screen, are unsuitable for display on a television screen. Accordingly, the inventors have thought that favorable visibility and simplicity of operation are strongly required for a user interface of a digital home appliance using a television screen and that an operation method as generally used for a PC cannot always provide excellent usability to a user of such an appliance.

The present invention has been made on the basis of the aforementioned problem recognized by the inventors, and a major purpose thereof is to improve user friendliness of an apparatus that processes electronic content.

Means to Solve the Problem(s)

To solve the problem above, an information processing apparatus of an embodiment of the present invention comprises: a storage unit configured to store a plurality of icons representing a plurality of items of content; a screen generating unit configured to generate a selection screen for allowing a user to select a desired item of content from among a plurality of items of content, in which the selection screen includes a list in which a plurality of icons are arranged; and a display control unit configured to display a screen generated by the screen generating unit. The screen generating unit further arranges in the list a search icon used to search for an item of content.

Another embodiment of the present invention is an information processing method. The method comprises: generating, by an information processing apparatus, a selection screen for allowing a user to select a desired item of content from among a plurality of items of content, in which the selection screen includes a list in which a plurality of icons representing a plurality of items of content are arranged; and displaying, by the information processing apparatus, a screen generated in the generating. In the generating, a search icon used to search for an item of content is further arranged in the list.

Yet another embodiment of the present invention is an information processing apparatus. The apparatus comprises: a first screen generating unit configured to generate a first screen on which first information is arranged; a second screen generating unit configured to generate a second screen on which second information is arranged; and a display control unit configured to display the first screen and the second screen. The first screen generating unit arranges the first information in a first area on the first screen and arranges part of the second information in a second area on the first screen. The display control unit displays, when operation input indicating a direction from the first area to the second area on the first screen is detected, the second screen in place of the first screen.

Still yet another embodiment of the present invention is an information processing method. The method comprises: generating, by an information processing apparatus, a first screen on which first information is arranged; generating, by the information processing apparatus, a second screen on which second information is arranged; and displaying, by the information processing apparatus, the first screen and the second screen. In the generating the first screen, the first information is arranged in a first area on the first screen and part of the second information is arranged in a second area on the first screen. In the displaying, when operation input indicating a direction from the first area to the second area on the first screen is detected, the second screen is displayed in place of the first screen.

Still yet another embodiment of the present invention is an information processing apparatus. The apparatus comprises: a notification acquisition unit configured to acquire a notification transmitted from an external device to a user, to which information indicating a category thereof is added; a selected category acquisition unit configured to acquire a category to be viewed, selected by a user from among a plurality of categories predetermined for notifications; a viewing screen generating unit configured to generate a viewing screen for presenting, among notifications transmitted from an external device, a notification related to a category selected by a user; and a display control unit configured to display a viewing screen generated by the viewing screen generating unit and to switch, when a user changes the category to be viewed, the display to a viewing screen presenting a notification related to the changed category.

A further embodiment of the present invention is an information processing method. The method comprises: acquiring, by an information processing apparatus, a notification transmitted from an external device to a user, to which information indicating a category thereof is added; acquiring, by the information processing apparatus, a category to be viewed, selected by a user from among a plurality of categories predetermined for notifications; generating, by the information processing apparatus, a viewing screen for presenting a notification related to a category selected by a user, among notifications transmitted from an external device; and displaying a viewing screen generated in the generating, and switching, when a user changes the category to be viewed, the display to a viewing screen presenting a notification related to the changed category, in which the displaying and the switching are performed by the information processing apparatus.

Optional combinations of the aforementioned constituting elements, and implementations of the invention in the form of methods, systems, programs, and recording media storing programs may also be practiced as additional modes of the present invention.

Advantageous Effects of Invention

The present invention improves user friendliness of an apparatus that processes electronic content.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

MODE FOR CARRYING OUT THE INVENTION

Figure 1:
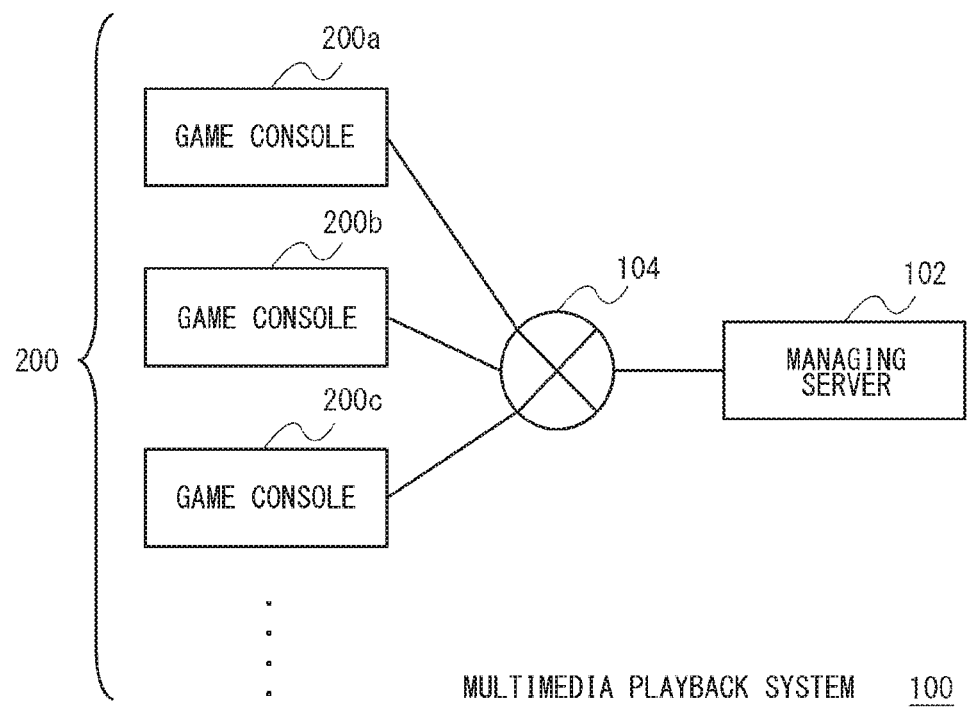
FIG. 1 shows a configuration of a multimedia playback system according to an embodiment.

In a multimedia playback system according to the present embodiment, a multimedia playback device plays or executes multiple types of items of electronic content including still images, moving images, music, broadcast, game software, and web pages (hereinafter, also simply expressed as "executes content"). The multimedia playback device is designed to use a screen of a television receiver as a display screen, and a user operates the device using information displayed on the screen and operation buttons provided on a controller.

A multimedia playback device (a game console 200 in the examples below) according to the present embodiment integrates playing of multiple items of content under a common user interface, so as to provide unified operability to a user. Such a user interface is assumed to be operated by a user in about 3 meters away from a television receiver using a controller, which has larger operational restriction and, typically, to which fewer kinds of operations can be input, compared to a keyboard, a mouse, or the like.

There will be described user interfaces used before content is executed, including a navigation screen for guiding a user to playing of desired content and a screen for operating a system function in the multimedia playback device. In the following, three major features of the user interfaces provided by the multimedia playback device according to the embodiment will be given.

(1) The multimedia playback device provides, as content selection screens on which a user selects content to be executed, a home screen on which content icons are arranged in a row, and a library screen on which content icons are arranged in multiple rows. In the row of content icons on the home screen, a library icon for shifting the screen to the library screen is arranged. When a user cannot find desired content on the home screen, the user can select the library icon to search for desired content on the library screen that concurrently displays more content icons.

An "icon" in the present specification is an object acting as a trigger for executing a certain function, and such icons may be configured with various images, texts, symbols, or combinations thereof. For example, the appearance of an icon for a game may be provided by a thumbnail image or a moving image thumbnail that graphically represents the contents of the game.

(2) The user interfaces of the multimedia playback device are basically formed of three layers: the first layer (upper layer) is a system screen that functions as a system function selection screen on which a user selects a desired system function from among multiple system functions provided by the multimedia playback device; the second layer (middle layer) is a home screen on which a user selects desired content, as stated in the above section (1); and the third layer (lower layer) is a live information screen that displays information related to the content selected on the home screen (e.g., information much talked about by users or hot information).

On the home screen, three information display areas of a first area, a second area, and a third area are provided. The first area of the home screen displays essential information for a content selection screen, or information appropriate for a theme of the screen. More specifically, the first area displays a row of content icons that allow a user to select desired content. Meanwhile, the second area displays part of information provided on the system screen. Also, the third area displays part of information provided on the live information screen.

When operation input indicating a direction from the first area to the second area is provided on the home screen, the screen shifts from the home screen to the system screen. Also, when operation input indicating a direction from the first area to the third area is provided, the screen shifts from the home screen to the live information screen. In this way, part of information provided on a transition destination screen, which is a screen after a transition, is displayed in advance on a transition source screen, which is a screen before the transition. Thereafter, when directional input toward the display position of the information on the transition destination screen is provided on the transition source screen, the screen is switched to the transition destination screen. Thus, there can be provided an operational interface that changes the screen according to a user's intuitive operation in a mode closer to the user's feeling.

(3) With a function to display notifications from external devices on the screen, among system functions of the multimedia playback device, each notification is categorized according to the contents thereof and displayed. Notifications to be displayed on a notification viewing screen are changed according to a user's operation of selecting a category. This helps a user efficiently check notifications.

FIG. 1 shows a configuration of a multimedia playback system 100 according to an embodiment. The multimedia playback system 100 comprises a game console 200a, a game console 200b, and a game console 200c (hereinafter, they may be collectively referred to as "game consoles 200") as multimedia playback devices, and a managing server 102. A game console 200 and the managing server 102 are connected with each other via a communication network 104, such as a LAN, a WAN, and the Internet. Also, multiple managing servers 102 may be provided to manage different pieces of information, and a game console 200 may select one of the multiple managing servers 102 as a server to access, according to information to be acquired.

The managing server 102 collects, from each of multiple game consoles 200 connected to the communication network 104, the playback status of content in the game console, such as data indicating the name of a game currently played and the progress of the game, and stores the information as content related information. Also, with regard to each of multiple items of content that can be played on a game console 200, the managing server 102 accepts registration of related information of the item of content from an external device and stores the information. The external device may also be a game console 200 or may be a license management apparatus for managing a license of content (including a game) available to the user, a PC (not shown), or the like.

The managing server 102 typically stores multiple kinds (three to ten kinds, for example) of content related information for one item of content (one game title or one music track, for example). The managing server 102 may accept a user's login via a game console 200. Further, the managing server 102 may collect various kinds of content related information as described below from a game console 200 of a user who has already logged in, or may accept uploading of such information from the game console 200.

In the following, examples of content related information of a game title are cited.

(1) Information on a user who has purchased the game (2) Information on a user who is currently online or typically a user who is currently playing the game (3) A user's impression or review information on the game (4) A moving image of game play or a screen capture image uploaded by a user (5) The progress of the game played by a user (the number of trophies won by the user, for example)

(6) The state of a player's character of a user (7) Various community information (such as information on a participant in the community, a call for participants for a party, and a call for participants for a tournament)

(8) Item information (new items now available for purchase in the game, for example)

(9) Advertisement for other content (including a game of another title in the same series and related music or books besides games, for example)

(10) Information on a bulletin board used for information exchange among users

Further, for video content including movies, a download history or a streaming history of each user may also be stored. Such information also includes a user ID (a login ID of a user registered in the managing server 102, for example), so that information can be extracted not only for each item of content but also for each user based on the user ID.

Content related information includes a recorded date and time on which the information is recorded in the managing server 102, or in other words, a date and time on which the managing server 102 resisters the information from a user or an external device. The managing server 102 particularly identifies, as new information, content relate information with a relatively new recorded date and time, such as information of which the recorded date and time has a difference of one day or less from the current date and time. The managing server 102 manages content related information in units of items of content and stores content related information of items of content with different titles as different pieces of information. Meanwhile, new information is defined by the recorded date and time thereof and is content related information associated with multiple items of content. In the following, content related information and new information may be collectively referred to as "live information", meaning hot information.

The managing server 102 stores each piece of multiple types of content related information (including new information) in association with both of "detailed related information" and a "related information summary". The managing server 102 provides such information to a game console 200 according to a request from the game console 200. Detailed related information corresponds to the entirety of content related information and is displayed on a detailed information screen of a game console 200. A related information summary is information extracted from detailed related information according to a predetermined rule, or in other words, a reduced amount of detailed related information. For example, a related information summary may be a title and a thumbnail image in detailed related information. A related information summary is displayed on a home screen 10 and a related information screen 50 of a game console 200. A related information summary and detailed related information are related to each other based on a predetermined information ID, so as to be stored.

The managing server 102 stores related information summaries that are classified into categories according to the contents thereof. The categories in the embodiment include "Overview", "Friends who own this (friends who have the content)", "Your trophies (trophies won by the user)", "New feed", and "Shared media". The "Overview" is a category to which information mainly provided by a manager of the managing server 102 or by a content vendor belongs, such as a new character, a new item, and advertisement, for example. The "Shared media" is a category to which information on content shared among multiple users belongs, such as a moving image of game play or a capture image uploaded and published by each user, for example. When providing a related information summary to a game console 200, the managing server 102 transmits, to the game console 200, the data of the related information summary to which information indicating a category of the related information summary is added.

Besides content related information, the managing server 102 also stores user information of each of multiple game consoles 200. Upon reception of a request for user information from a game console 200, the managing server 102 provides user information of another game console 200 to the game console 200 that has submitted the request. For example, the managing server 102 provides an image or attribute information associated with a friend user who has been registered in the managing server 102 in advance by the user of the game console 200 that has submitted the request.

The managing server 102 also stores data to be conveyed to each of multiple users (a so-called notification). The notification data includes multiple types (or categories) of information. In the embodiment, information in the five categories of "Notification", "Invitation", "Offer", "Download", and "Upload" is included. Upon detection of registration of new notification data directed to a user and the category of the notification data, the managing server 102 transmits the notification data with category information added thereto to the game console 200 of the destination user. In the embodiment, the managing server 102 voluntarily provides a push notification of notification data.

In this way, the managing server 102 stores various information to be displayed on various user interfaces of a game console 200 and provides such information to the game console 200, as needed. For example, when a certain content icon is brought into focus on the home screen 10, which will be described later, of a game console 200, the managing server 102 transmits, to the game console 200, information on a friend user who has already purchased the content. Such information includes an image or a text registered in the managing server 102 in advance by the friend user.

A detailed explanation on the game console 200 will be given below.

Figure 2:
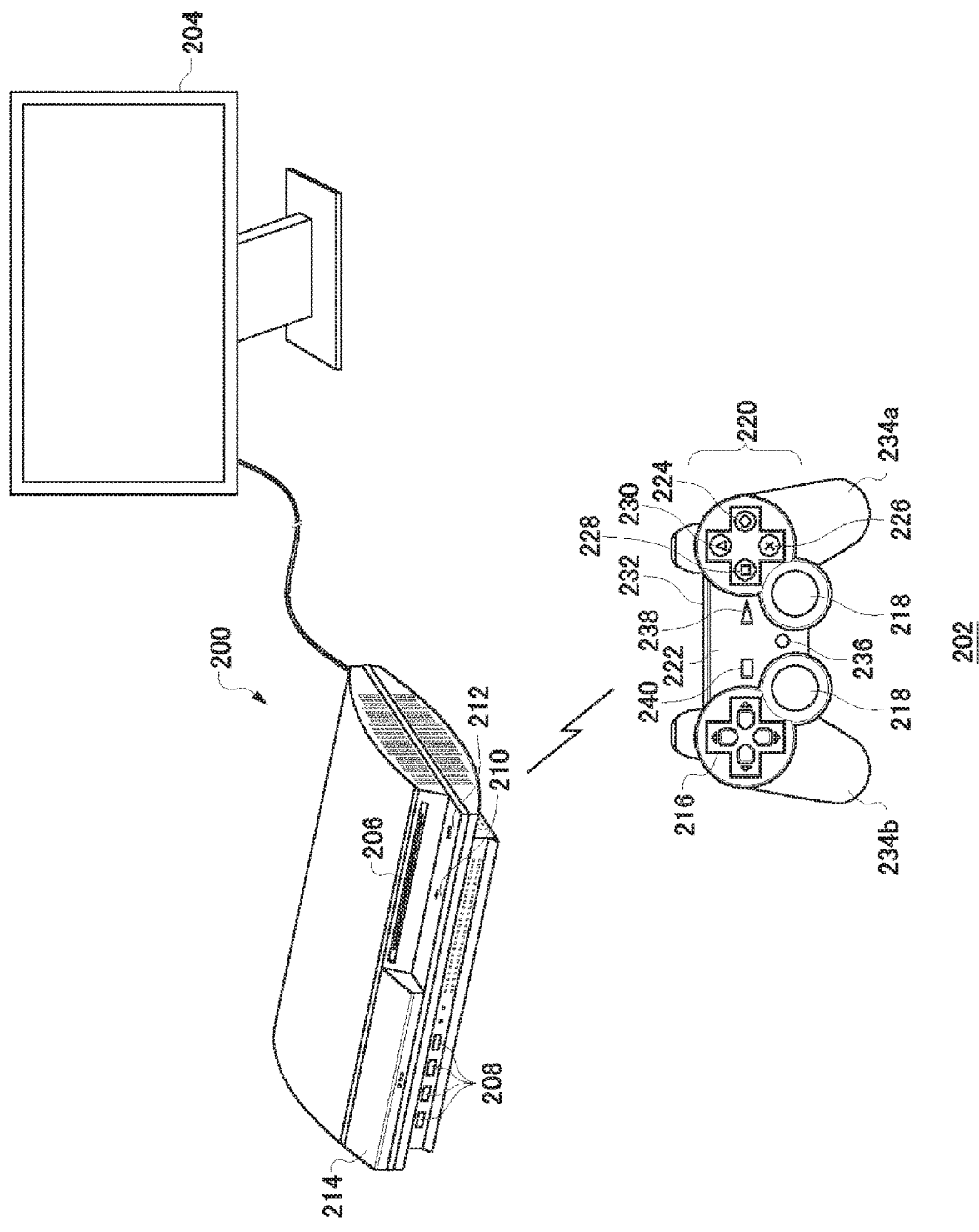
FIG. 2 shows an external configuration of a game console shown in FIG. 1.

FIG. 2 shows an external configuration of a game console 200 shown in FIG. 1. Although the game console 200 is represented by a stationary game device in the present embodiment, the game console 200 may be a portable game device formed integrally with a display device. The game console 200 is connected to a controller 202 and a television monitor 204. The game console 200 is provided with a function to execute various types of games, a function to create and edit e-mails, a function to view web pages, a function to play back movies or music, and the like. The controller 202 is connected to the game console 200 wirelessly. The television monitor 204 is connected to the game console 200 and displays the contents of games, web pages, movies, or the likes, while also outputting sound. Although not shown in FIG. 2, the game console 200 is connected to a communication device, such as a router, via a LAN cable so as to be connected to the Internet.

The game console 200 is provided with a disk insertion slot 206 for an optical disk with a diameter of 12 centimeters, USB connecting terminals 208, etc. The disk insertion slot 206 is configured so as to be able to load an optical disk including a Blu-ray Disk (BD) (trademark or registered trademark), a DVD-ROM, and a CD-ROM. A touch sensor 210 is a sensor used to remove a disk, and a touch sensor 212 is a sensor used to turn on or off the power. Although not shown in the figure, a power switch, an audio-visual output terminal, an optical digital output terminal, an AC power input terminal, a LAN port, an HDMI terminal, and the like are provided on the back side of the game console 200. In addition, the game console 200 may have an IEEE1394 terminal so as to be able to communicate via IEEE1394.

The game console 200 is also provided with a multimedia slot. A multimedia slot case 214 is a cover member and configured so that the multimedia slot is exposed when the multimedia slot case 214 is open, although not shown in the figure.

The game console 200 performs various types of processes for executing a game, composing, editing, and receiving an e-mail, and browsing a web page, for example, in accordance with an application program for a game, e-mails, or a web browser and with an instruction from the user via the controller 202. The application program may be loaded from various types of recording media, such as an optical disk including a CD-ROM, a DVD-ROM, and a BD, a hard disk drive, and semiconductor memory, or may be downloaded via various types of transmission media, such as a LAN and a CATV circuit.

In addition to executing a game, composing, editing, and receiving an e-mail, and browsing a web page based on application programs, the game console 200 can play back (or decode) video and audio data, such as audio data recorded in a CD and a movie recorded in a DVD or a BD. The game console 200 can also operate based on other various types of application programs. Also, a driver program for playing back a DVD or a BD is recorded in a hard disk drive 334 built in the game console 200, for example.

The controller 202 is driven by a battery (not shown) and is provided with a plurality of buttons and keys for entering operation input to advance a game or the like. When the user operates a button or a key of the controller 202, the operation input is transmitted to the game console 200 wirelessly or by wires.

The controller 202 is provided with a direction key 216, analog sticks 218, and four kinds of operation buttons 220. The direction key 216, the analog sticks 218, and the operation buttons 220 are input units provided on a housing upper surface 222. The four kinds of buttons 224, 226, 228, and 230 are marked with different symbols in different colors so that each button can be distinguished from another. More specifically, a circle button 224 is marked with a red circle, a cross button 226 with a blue cross, a square button 228 with a purple square, and a triangle button 230 with a green triangle. Although not shown in the figure, a housing rear surface 232 of the controller 202 is provided with a plurality of LEDs.

The user holds a left grip part 234*b* with the left hand and a right grip part 234*a* with the right hand so as to operate the controller 202. The direction key 216, the analog sticks 218, and the operation buttons 220 are provided on the housing upper surface 222 so that the user can operate them while holding the left grip part 234*b* and the right grip part 234*a*.

A button with an LED (hereinafter, referred to as a "PS button 236") is also provided on the housing upper surface 222. The PS button 236 is used for a screen transition between the home screen and another screen of the game console 200 in the embodiment. The PS button 236 also has functions to notify the user of an incoming mail and to indicate the charging status of the battery of the controller 202, with the light-emitting state of the LED. For example, the LED is lit in red during charging, lit in green when charging is completed, and made to blink in red when the remaining battery level is low. Further, a select button 240 and a start button 238 are also provided on the housing upper surface 222 and assigned predetermined functions.

The direction key 216 is provided with direction indicator keys indicating "up," "down," "left," and "right", operated by a user to move a game character upward, downward, leftward, or rightward on a screen in a game, to move a text input cursor upward, downward, leftward, or rightward on an e-mail compose screen, to scroll through a web page while browsing, or to move a cursor upward, downward, leftward, or rightward on a screen, for example. The "up," "down," "left," and "right" direction indicator keys are used to provide not only a direction instruction for the up, down, left, or right direction but also a direction instruction for an oblique direction. For example, by concurrently pressing the "up" and "right" direction indicator keys, the user can provide a direction instruction for the obliquely upper right direction to the game console 200. The same applies to other direction indicator keys, and, by concurrently pressing the "down" and "left" direction indicator keys, for example, the user can provide a direction instruction for the obliquely lower left direction to the game console 200.

Each operation button 220 is assigned a different function by an application program. In the embodiment, the triangle button 230 is assigned the function to instruct the display of a menu; the circle button 224 is assigned the function to instruct the cancel of a selected item or returning; the cross button 226 is assigned the function to instruct the determination of a selected item; and the square button 228 is assigned the function to instruct the display or hiding of a table of contents or the like. As a modification, the circle button 224 may be assigned the function to instruct the determination of a selected item, and the cross button 226 may be assigned the function to instruct the cancel of a selected item or the like.

An analog stick 218 is provided with: a rotary operator that enables a tilting operation in an arbitrary direction around the rotating fulcrum of the operation shaft; and a variable-analog-value output means for outputting a variable analog value according to an operation of the rotary operator. The rotary operator is provided at the tip of the operation shaft, which is provided so as to return to a neutral position by means of an elastic member. When no tilting operation is provided by the user, the rotary operator is in an upright state (a state with no tilt) and keeps the position (a reference position). The variable-analog-value output means is provided with a variable resistance element, etc. The resistance of the variable resistance element changes according to an operation of the rotary operator. When the rotary operator of the analog stick 218 is operated to tilt, the controller 202 detects coordinate values on an X-Y coordinate based on the amount of the inclination with respect to the reference position and on the direction of the inclination and transmits to the game console 200 the coordinate values as an operation output signal.

Figure 3:
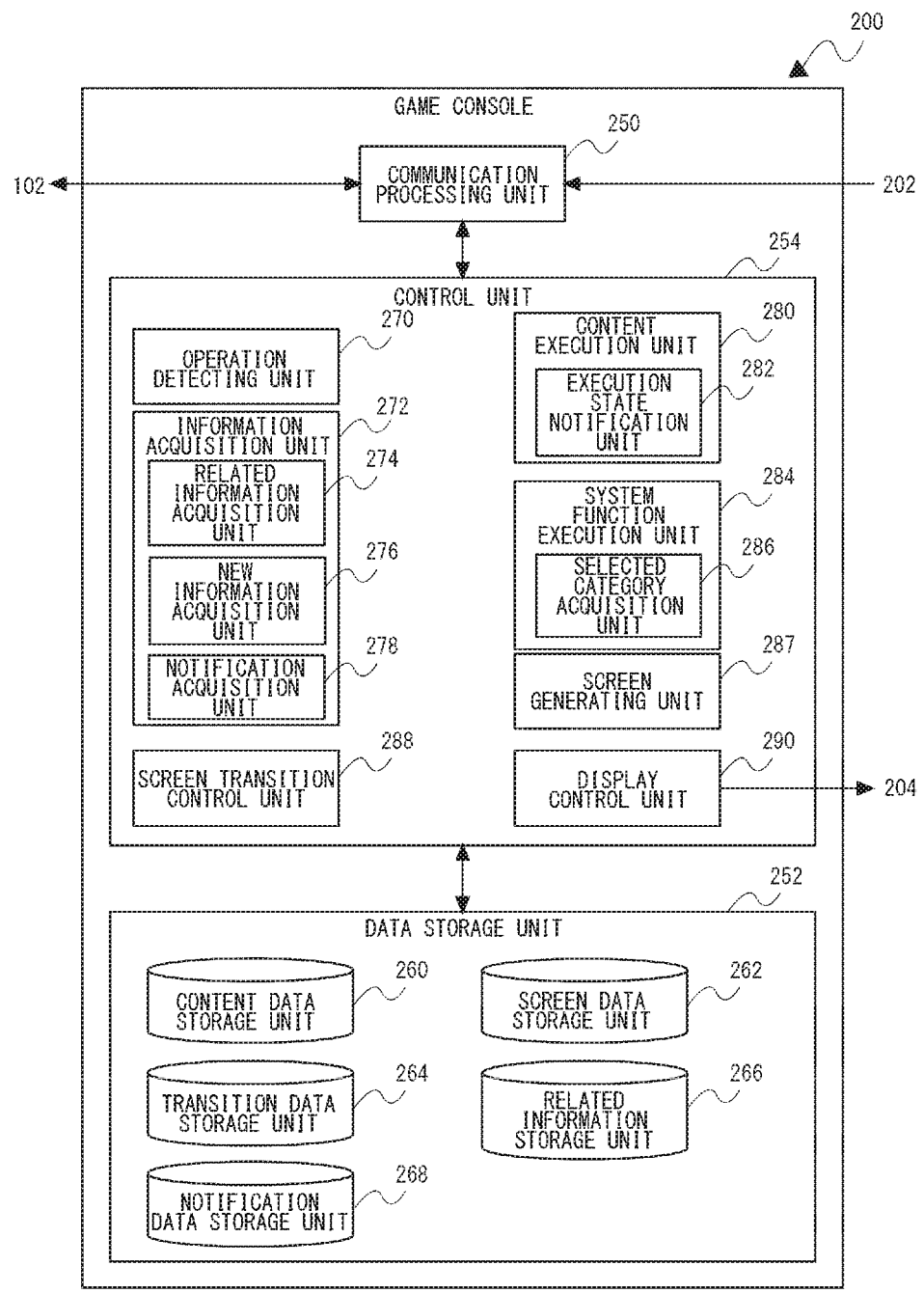
FIG. 3 is a block diagram that shows a functional configuration of a game console shown in FIG. 1.

FIG. 3 is a block diagram that shows a functional configuration of a game console 200 shown in FIG. 1. The game console 200 comprises a communication processing unit 250, a data storage unit 252, and a control unit 254. Each block shown in a block diagram in this specification can be implemented by an element such as a CPU, GPU, or memory of a computer or by a mechanism in terms of hardware, and by a computer program or the like in terms of software. FIG. 3 illustrates functional blocks implemented by the cooperation of those components. Therefore, it will be obvious to those skilled in the art that the functional blocks may be implemented in a variety of forms by combinations of hardware and software.

For example, a program module corresponding to each of the functional blocks within the control unit 254 may be stored in a hard disk or a flash memory in the game console 200, and a function of the control unit 254 may be implemented when a CPU or GPU of the game console 200 reads a corresponding program module into the main memory and executes the program module, as needed. Also, a function of the data storage unit 252 may be implemented by a hard disk or a flash memory in the game console 200. On the game console 200, an OS (Operating System) is installed to provide overall control of the hardware and software in the game console 200, though not shown in the figures. Each functional block in FIG. 3 may be implemented by using a function of the OS, as needed, or in other words, a part of the functions of each functional block may be implemented by the OS.

The communication processing unit 250 controls communication with the managing server 102. The communication processing unit 250 transmits data provided by the control unit 254 to the managing server 102 and provides data received from the managing server 102 to the control unit 254. The communication processing unit 250 also controls communication with the controller 202, and receives, from the controller 202, data indicating an operation on the controller 202 and provides the data to the control unit 254.

The data storage unit 252 is a storage area that stores various data for data processing performed by the control unit 254, and setting information. The data storage unit 252 includes a content data storage unit 260, a screen data storage unit 262, a transition data storage unit 264, a related information storage unit 266, and a notification data storage unit 268.

The content data storage unit 260 stores data of electronic content installed on the game console 200. Such data are various application data that can be executed, played, and used by the game console 200, including data used to play a game, a music track, a moving image, and a still image. The content data storage unit 260 also stores the installation status of each item of content on the game console 200. The installation status is information indicating, for example, "installed (i.e., executable)", "not installed", "not downloaded", and "not authorized".

The content data storage unit 260 further stores an execution history of each of multiple items of content and multiple applications that can be used by the user on the game console 200. The execution history includes an access date and time on which the user has accessed the item of content or application.

More specifically, the access dates and times of an item of content include:

(1) a date and time on which the content data is downloaded into or installed on the game console 200;

(2) a date and time on which the content data is purchased at a virtual store site (hereinafter, also referred to as a "store site") on the Internet;

(3) a date and time on which the item of content is started in the state where the user has already logged in the managing server 102;

(4) a date and time on which the user logs in the managing server 102 while starting the item of content; and (5) a date and time on which a corresponding optical disk is inserted into the disk insertion slot 206 in the state where the user has already logged in the managing server 102.

The content data storage unit 260 stores each of the dates and times above and the ID of the content related to each other. The same applies to an application.

The screen data storage unit 262 stores data necessary for screen display performed by a display control unit 290, which will be described later. For example, the screen data storage unit 262 stores screen layout data, an icon image, and a background image. The icon image may be an image of an icon representing each of multiple items of content available for the user, such as a thumbnail image of each item of content. The item of content may be a game, a music track, or a movie, for example. The icon image may also be an image of an icon representing each of multiple applications available for the user. The application may be, for example, an application for executing or playing content, such as a player for moving images, still images, or music, a web browser, and a mailer.

A background image stored in the screen data storage unit 262 is an image displayed as the background of the home screen 10, related information screen 50, or a system screen 70, which will be described later. The background image on the system screen 70 may be a content background image, which is related, in advance, to each of multiple items of content available for the user.

The transition data storage unit 264 stores information related to screen transition on the game console 200. For example, the transition data storage unit 264 stores screen transition rules, in which a transition source screen, a transition destination screen, and a transition condition are defined and related to each other. The screen transition rules will be described later in association with FIG. 13. The transition data storage unit 264 also stores information on a transition source screen for the case of screen transition using the PS button 236.

The related information storage unit 266 stores content related information acquired by a related information acquisition unit 274, which will be described later, and the ID of the content related to each other. The related information storage unit 266 also stores new information acquired by a new information acquisition unit 276. The notification data storage unit 268 stores notification data directed to the user and acquired by a notification acquisition unit 278, which will be described later, in association with category information added to the notification data in advance and an unread flag (the initial value is ON).

The control unit 254 performs various data processes. This specification particularly describes a configuration in which the control unit 254 controls display on a user interface of the game console 200, such as the home screen, the live information screen, and the system screen, and also controls transitions between such screens. The control unit 254 comprises an operation detecting unit 270, an information acquisition unit 272, a content execution unit 280, a system function execution unit 284, a screen generating unit 287, a screen transition control unit 288, and a display control unit 290.

The operation detecting unit 270 detects, via the communication processing unit 250, an operation input by a user to the controller 202. For example, the operation detecting unit 270 identifies the type of an operation button 220 pressed on the controller 202 or the direction of an operation provided on the analog sticks 218. The operation detecting unit 270 then notifies another functional block of the detected operation.

The information acquisition unit 272 transmits or receives, via the communication processing unit 250, data to or from the managing server 102 and acquires various information stored in the managing server 102. The information acquisition unit 272 includes a related information acquisition unit 274, a new information acquisition unit 276, and a notification acquisition unit 278.

In accordance with a user's operation on the screen, the related information acquisition unit 274 identifies the ID of content of which related information is to be acquired, and transmits, to the managing server 102, a request for content related information for which the ID is specified. The related information acquisition unit 274 then receives the content related information transmitted from the managing server 102 and stores the information in the related information storage unit 266.

More specifically, the related information acquisition unit 274 acquires a related information summary (including an information ID) of focus content when the home screen 10 or the related information screen 50 is displayed. Thereafter, when a detailed information screen is to be displayed, the related information acquisition unit 274 acquires, from the managing server 102, detailed related information identified by the information ID of the related information summary that was brought into focus on the related information screen 50.

The new information acquisition unit 276 transmits a request for new information to the managing server 102 in accordance with a user's operation on the screen. The new information acquisition unit 276 then receives the new information transmitted from the managing server 102 and stores the information in the related information storage unit 266. The related information acquisition unit 274 and the new information acquisition unit 276 may acquire information from the managing server 102 in accordance with a user's operation and/or regularly at predetermined time intervals.

The notification acquisition unit 278 acquires notification data for which a push notification has been provided by the managing server 102 and stores the notification data with category information added thereto in the notification data storage unit 268. At the time, the unread flag is set to ON. Although not shown in FIG. 3, the information acquisition unit 272 also includes a functional block for acquiring information other than notifications stored in the managing server 102. The information other than notifications includes, for example, friend user information on a friend user who is currently online (logged in the managing server 102), group message information, party information, and trophy information of the user. The user can view such information using a system function of the game console 200.

The content execution unit 280 reads the data of content of which the execution has been ordered on the home screen 10 or related information screen 50, which will be described later, from the content data storage unit 260 or an optical disk inserted into the disk insertion slot 206, so as to execute or play the content. The content execution unit 280 then provides data indicating a result of execution or playing of the content, such as image data, to a content execution screen generating unit 328, which will be described later.

The content execution unit 280 stores, in the content data storage unit 260, identification information for identifying the executed content together with the current date and time, so as to update the execution history (access date and time) of the content stored in the content data storage unit 260. Similarly, when an application (such as an application used to play an item of content) is executed, the content execution unit 280 updates the execution history (access date and time) of the application stored in the content data storage unit 260.

An execution state notification unit 282 in the content execution unit 280 transmits, to the managing server 102, data indicating the state of content execution, such as the name of the currently-played game, the progress of the game, and the state of a player's character, so as to register such data in the managing server 102.

The system function execution unit 284 performs a system function selected by the user from among multiple system functions (or system menus) provided by the game console 200. The system functions in the game console 200 include notification viewing, friend viewing, group messages, and parties. A selected category acquisition unit 286 in the system function execution unit 284 acquires a category specified by the user on a notification viewing screen 90, which will be described later, and notifies a notification viewing screen generating unit 326 of the category information. For example, the selected category acquisition unit 286 may memorize a category currently selected and, based on the arrangement of category tabs on the notification viewing screen 90 and the directional input provided by the user onto the notification viewing screen 90, may identify a newly-selected category.

The screen generating unit 287 generates data of various screens used as user interfaces of the game console 200 and updates screen data according to operation input from a user. The screen generating unit 287 then provides such generated and updated screen data to the display control unit 290 so as to display various screens on the television monitor 204. The detailed configuration of the screen generating unit 287 will be described later in association with FIG. 4.

The screen transition control unit 288 controls switching between multiple kinds of screens according to screen transition rules stored in the transition data storage unit 264. For example, when a transition condition defined in the screen transition rules is met, typically when a certain user operation is detected, the screen transition control unit 288 instructs the screen generating unit 287 and the display control unit 290 to generate and display a transition destination screen (i.e., to switch the screen). When the screen is switched, the screen transition control unit 288 stores the information on the transition source screen in the transition data storage unit 264. Accordingly, when a "back" operation (by pressing the circle button 224 or the PS button 236, for example) is provided on the transition destination screen, the screen transition control unit 288 provides control to redisplay the transition source screen based on the stored information of the transition source screen.

The display control unit 290 controls displaying of a user interface of the game console 200. At least part of the display control unit 290 may be implemented by a display driver. More specifically, the display control unit 290 outputs, to the television monitor 204 via the display driver, the data of multiple kinds of screens generated by the screen generating unit 287, so as to display each of the screens on the television monitor 204.

According to a switching instruction from the screen transition control unit 288, the display control unit 290 displays another screen specified as a transition destination screen, instead of the screen that has been displayed. Also, when the screen generating unit 287 updates the contents of the screen that has been displayed and generates the data of a new screen, the display control unit 290 displays, on the television monitor 204, the new screen instead of the screen that has been displayed.

Figure 4:
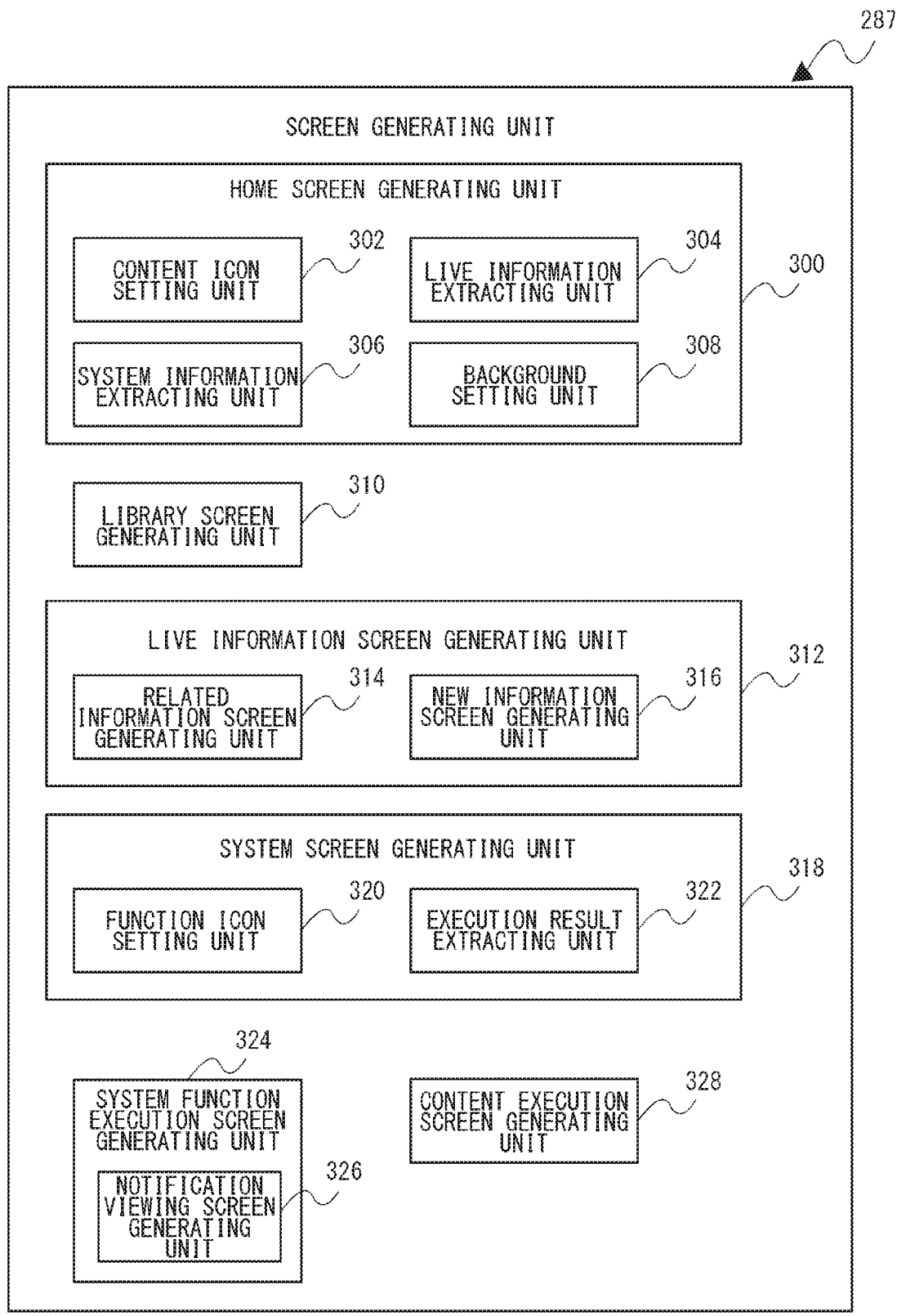
FIG. 4 is a block diagram that shows a detailed configuration of a screen generating unit shown in FIG. 3.

FIG. 4 is a block diagram that shows a detailed configuration of the screen generating unit 287 shown in FIG. 3. The screen generating unit 287 comprises a home screen generating unit 300, a library screen generating unit 310, a live information screen generating unit 312, a system screen generating unit 318, a system function execution screen generating unit 324, and a content execution screen generating unit 328. The screen generating unit 287 may be implemented by an image processing function provided by a CPU or GPU. In the following, each functional block in the screen generating unit 287 will be described in association with a relevant screen provided by the game console 200.

[Home Screen]

The home screen is a screen initially displayed after the game console 200 is activated (after the power is turned on, for example) and a screen for allowing a user to select an item of content to be processed from among multiple items of content available for the user. The home screen displays a list of icons for multiple items of content and multiple applications, or in other words, a list in which icons for multiple items of content and multiple applications are arranged.

The screen initially displayed means substantially the first user interface provided to the user and can also be regarded as substantially the first screen that can be operated by the user. Therefore, another screen presenting a message of "activating" or the like may be displayed before the home screen is displayed. The item of content to be processed may be an item of content to be executed or played on the game console 200 or may be an item of content of which related information is to be viewed.

Also, content being available for the user means that the user has a legitimate right to use, play, and execute the content. For example, an item of content available for the user may be an item of content that was stored in a recording medium and purchased by the user and then installed on the game console 200. Also, it may be an item of content of which the license was purchased online or offline and which was downloaded from a certain server, or may be an item of content of which the license was purchased but which was not downloaded or installed yet. Further, when the user uses a subscription service by which playing of content or the like is permitted for a limited predetermined license period, an item of content of which the predetermined license period has not elapsed since the license was obtained by the user is also an item of content available for the user.

Figure 5:
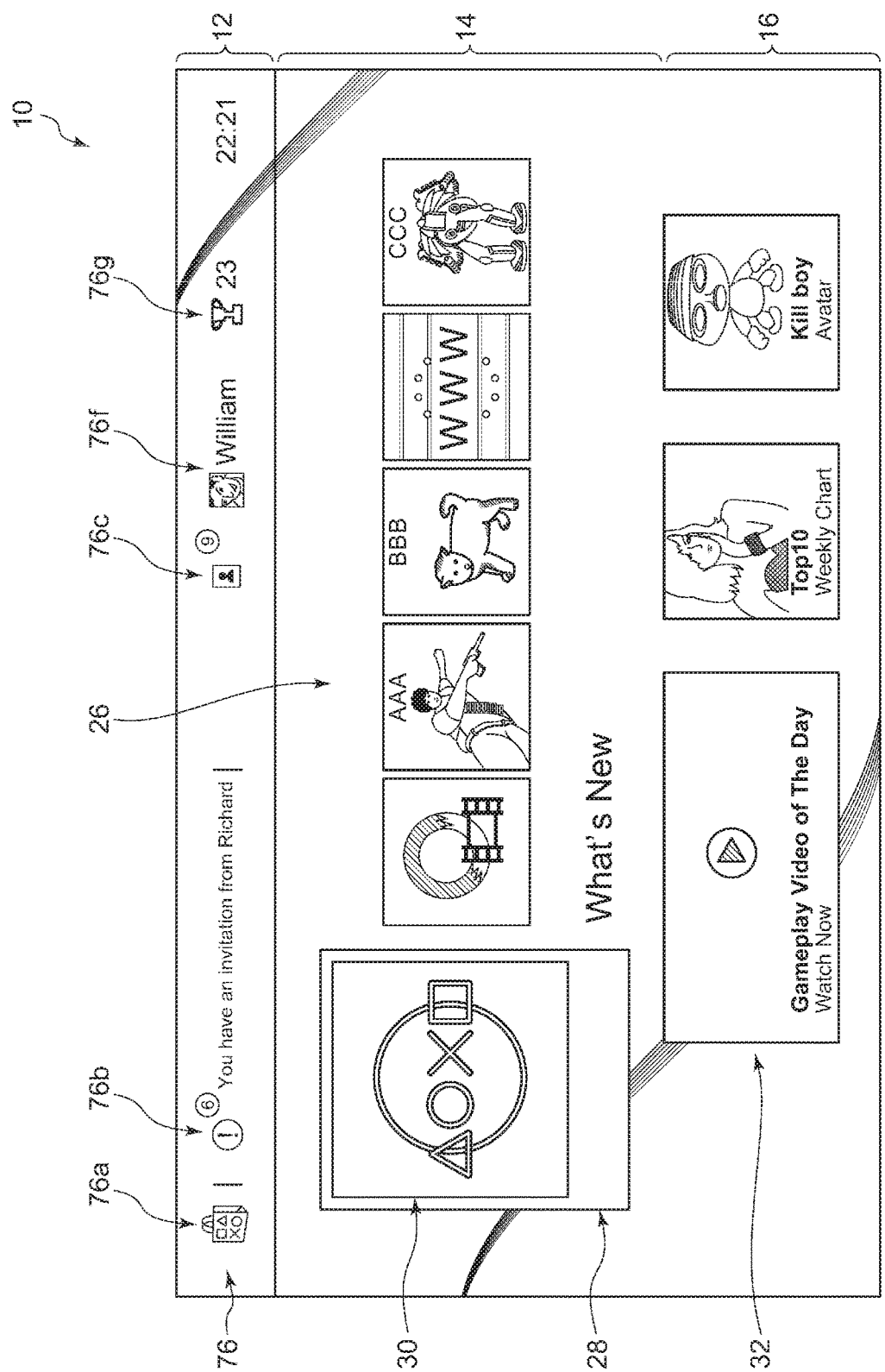
FIG. 5 shows a home screen.

The home screen generating unit 300 generates the data of the home screen and allows the display control unit 290 to display the home screen. FIG. 5 shows a home screen 10. The home screen 10 has three areas that each display items with a different theme. More specifically, the home screen 10 is divided into the three areas of a system area 12, a content area 14, and a live area 16 arranged in this order from the top.

The home screen generating unit 300 includes a content icon setting unit 302, a live information extracting unit 304, a system information extracting unit 306, and a background setting unit 308. The content icon setting unit 302 acquires, from the screen data storage unit 262, multiple content icons representing multiple items of content available for the user and multiple application icons representing multiple applications available for the user. Hereinafter, content icons including application icons are collectively referred to as "content icons". The content icons include icons for games, moving image players, music players, and web browsers. A row of content icons is also referred to as an "icon row".

The content icon setting unit 302 aligns multiple content icons 26, or in other words, sets a list of multiple items of content and applications, in the content area 14. As shown in FIG. 5, multiple content icons 26 are aligned and displayed so that an area for displaying system information or content-related information can be secured on the home screen 10.

The content icon setting unit 302 arranges a focus frame 28 at a predetermined position in the content area 14. The focus frame 28 is an object for bringing a certain icon into focus, or a so-called cursor. The display position of the focus frame 28 is fixed on the home screen 10. The content icon setting unit 302 recognizes a content icon 26 to be displayed at a position corresponding to the display position of the focus frame 28 as an icon currently selected, and arranges the content icon 26 in a manner such that the content icon 26 is more highlighted than content icons 26 displayed in other positions. In the example of FIG. 5, the size of the icon is enlarged.

In the following, the action or the state of a content icon 26 being placed within the focus frame 28 is also referred to as "being brought into focus" or "the focus state". Further, an icon brought into focus is also referred to as a "focus icon", and content represented by the focus icon is also referred to as "focus content".

When operation input in the left or right direction from the user (typically operation input to the direction key 216 or analog sticks 218) is detected, the content icon setting unit 302 re-arranges each icon so that the icon row (or multiple content icons 26) is scrolled in a direction opposite to the input direction. In other words, the content icon setting unit 302 scroll-displays the icon row.

For example, when operation input in the right direction is provided, the content icon setting unit 302 moves the icon row to the left, so as to move a content icon 26, which has been positioned on the right side of the focus frame 28 before the operation input, in a direction toward the focus frame 28. According to operation input in the left or right direction onto the home screen 10, the content icon setting unit 302 serially changes the focus icon and changes the content icons 26 displayed on the screen.

Upon detection of a predetermined determination operation, specifically the pressing of the cross button 226, on the home screen 10, the content execution unit 280 starts processing for executing content corresponding to the focus icon at the time. In the content area 14, seven content icons 26 are concurrently displayed in total, i.e., one at the focus frame 28, one to the left of the focus frame 28, and five to the right of the focus frame 28. Accordingly, if there are many items of content available for the user, the user may provide operation input entries in the left and right directions to discover a desired item of content to be executed, set the corresponding icon to the focus icon, and input a determination operation therefor.

FIG. 5 shows the home screen 10 initially displayed. The content icon setting unit 302 arranges a new information icon 30 at the top (or the left end) of the icon row and arranges a library icon 38, which will be described later, at the tail (or the right end) of the icon row. When the home screen 10 is initially displayed, the content icon setting unit 302 places the new information icon 30 in the focus state. The content icon setting unit 302 then arranges, from the second position in the icon row, other content icons 26 in descending order of access date and time, which indicates when the user has accessed the content or application, with reference to the access date and time of each item of content or each application stored in the content data storage unit 260. In other words, an item of content having a newer access date and time is arranged closer to the left end, or closer to the focus frame 28, in the icon row when the home screen 10 is initially displayed.

When the new information icon 30 is placed in the focus state, the live information extracting unit 304 arranges, in the live area 16, live information items 32, which each present part of multiple pieces of new information acquired by the new information acquisition unit 276. Since the size of the live area 16 is limited, the number of pieces of new information displayed in the live area 16 is set to a predetermined number or to a predetermined upper limit number or less, in order to maintain the visibility of the live information items 32 at some distance.

In the present embodiment, the number of live information items 32 displayed in the live area 16 is limited to three.

In the example of FIG. 5, live information items 32 presenting three pieces of new information, among multiple pieces of new information, are displayed. Namely, when the new information icon 30 is brought into focus, the live information extracting unit 304 arranges and displays, in the live area 16, part of information displayed on a new information screen 60, which will be described later.

The system information extracting unit 306 arranges, in the system area 12, a part of multiple system function icons 76 representing multiple system functions provided by the game console 200. In the example of FIG. 5, there are displayed a store icon 76a, a notification icon 76b, a friend icon 76c, a profile icon 76f, and a trophy icon 76g. More specifically, the system information extracting unit 306 arranges and displays, in the system area 12, part of information displayed on a system screen 70, which will be described later. The trophy is an object indicating the execution state of multiple items of content, such as the progress of a game. For example, each time the user achieves a goal set in a game, a new trophy is given to the user.

The system information extracting unit 306 arranges an unread count indicator, which indicates the number of notifications that have not been read by the user ("6" in FIG. 5), in association with the notification icon 76b. Similarly, the system information extracting unit 306 arranges an online count indicator, which indicates the number of friend users online, or the number of friends currently logged in the managing server 102 ("9" in FIG. 5), in association with the friend icon 76c. Further, the system information extracting unit 306 arranges a trophy count indicator, which indicates the number of trophies won by the user ("23" in FIG. 5), in association with the trophy icon 76g.

The background setting unit 308 sets a background image on the home screen 10. In FIG. 5, since the focus icon is the new information icon 30, the same background image as set for the background of the system screen 70, which will be described later, is set.

Figure 6:
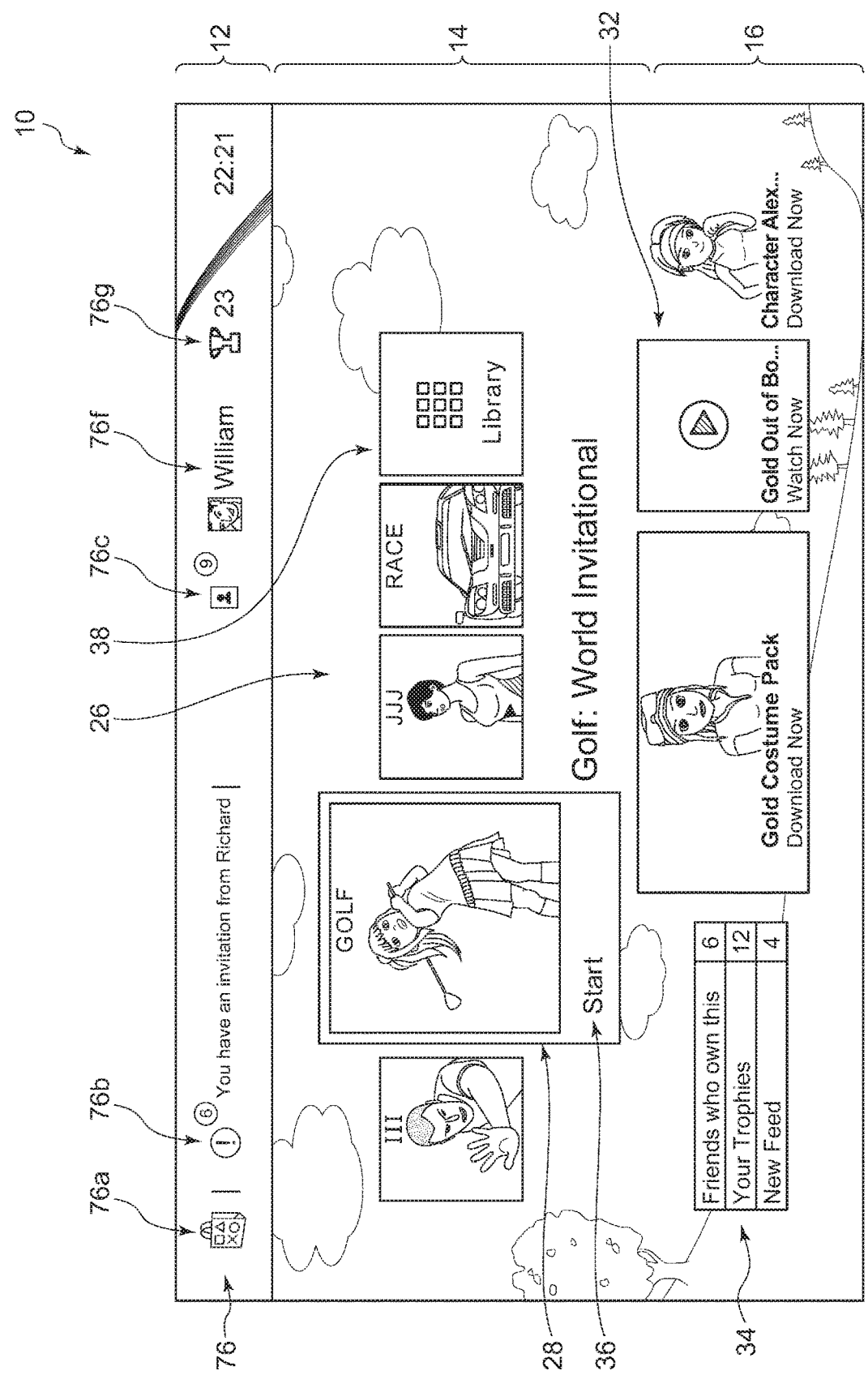
FIG. 6 also shows the home screen.

FIG. 6 also shows the home screen 10. In FIG. 6, a content icon 26 representing a golf game is brought into focus. The content icon setting unit 302 arranges an action indicator 36 in association with the focus icon, or displays the action indicator 36 near the focus icon. The action indicator 36 is information indicating an action to be performed when a determination operation is provided. The content icon setting unit 302 checks the installation status of the focus content stored in the content data storage unit 260 and sets a message related, in advance, to the status, as the action indicator 36.

For example, if the focus content is already installed, the content icon setting unit 302 will set "Start", which indicates starting the game after a determination operation is provided, as the action indicator 36. If the focus content is not installed yet, on the other hand, the content icon setting unit 302 will set "Install", which indicates installing the game after a determination operation is provided, as the action indicator 36. In FIG. 6, "Start" is displayed because the golf game set as the focus content is already installed, and, if the user inputs a determination operation, the playing of the golf game will start and the screen will switch to a screen of the golf game.

When a certain content icon 26 is placed in the focus state, the live information extracting unit 304 arranges and displays, in the live area 16, live information items 32 that each present content related information related to the focus content. A live information item 32 presents a part of multiple related information summaries related to the focus content, which have been acquired by the related information acquisition unit 274. Namely, when a certain content icon 26 is brought into focus, the live information extracting unit 304 previews part of the information displayed on the related information screen 50 for the focus content, even if the user has not input a switching operation to the related information screen 50.

Also in the example of FIG. 6, the number of pieces of content related information displayed in the live area 16 is set to a predetermined number or to a predetermined upper limit number or less. In the embodiment, three related information summaries that belong to the "Overview" category are arranged in the live area 16. In the example of FIG. 6, three live information items 32 are displayed in relation to the golf game as the focus content: one for prompting the downloading or purchase of costume data for a character, one for prompting the viewing of a moving image of game play, and one for prompting the downloading or purchase of a new character.

The live information extracting unit 304 also arranges an extracted category list 34 as a live information item 32. The live information extracting unit 304 provides, in the extracted category list 34, information on a part of multiple categories displayed in a category list 56 on the related information screen 50, which will be described later. In the embodiment, categories including numerical information are selected from among the categories displayed in the category list 56 on the related information screen 50, and the information on the selected categories is provided in the extracted category list 34.

On the home screen 10, a user cannot directly select a system function icon 76 in the system area 12 or a live information item 32 in the live area 16. If a user wishes to select a system function icon 76 or a live information item 32 and provides operation input indicating a direction to the corresponding area, the home screen 10 itself will switch to the related information screen 50 or the system screen 70 corresponding to the area.

When a certain content icon 26 is brought into focus in the content area 14, the background setting unit 308 acquires, from the content data storage unit 260, background image data related, in advance, to the focus content. The background setting unit 308 then sets the background image data for the focus content as the background of the content area 14 and live area 16 on the home screen 10. Meanwhile, as the background of the system area 12 on the home screen 10, the background setting unit 308 sets the background image on the system screen 70, which will be described later. Namely, the background setting unit 308 changes the background of the content area 14 and live area 16 each time the focus content changes, while continuously setting the background of the system screen 70 as the background of the system area 12 irrespective of the changes of the focus content.

As a modification, the background setting unit 308 may set the background image data for the focus content as the background of the live area 16 and may set the background image on the system screen 70 as the background of the content area 14. Also, the background setting unit 308 may set, as the background of the content area 14, an original background image that is different from both the background image on the system screen 70 and the background image for the focus content. In order to simplify the home screen 10, the background setting unit 308 may set the background image on the system screen 70 as a common background of the system area 12, content area 14, and live area 16. For such a common background, the background setting unit 308 may also set an original background image that is different from both the background image on the system screen 70 and the background image for the focus content.

As stated previously, the content icon setting unit 302 arranges the library icon 38 at the tail of the icon row. The library icon 38 is an icon used to search for an item of content or an application and is an icon for triggering a transition to a library screen, which will be described later. When a user cannot find desired content while scrolling the icon row, the user may bring the library icon 38 into focus and input a determination operation. When the library icon 38 is selected, the library screen generating unit 310 generates a library screen, and the display control unit 290 displays the library screen instead of the home screen 10.

[Library Screen]

Figure 7:
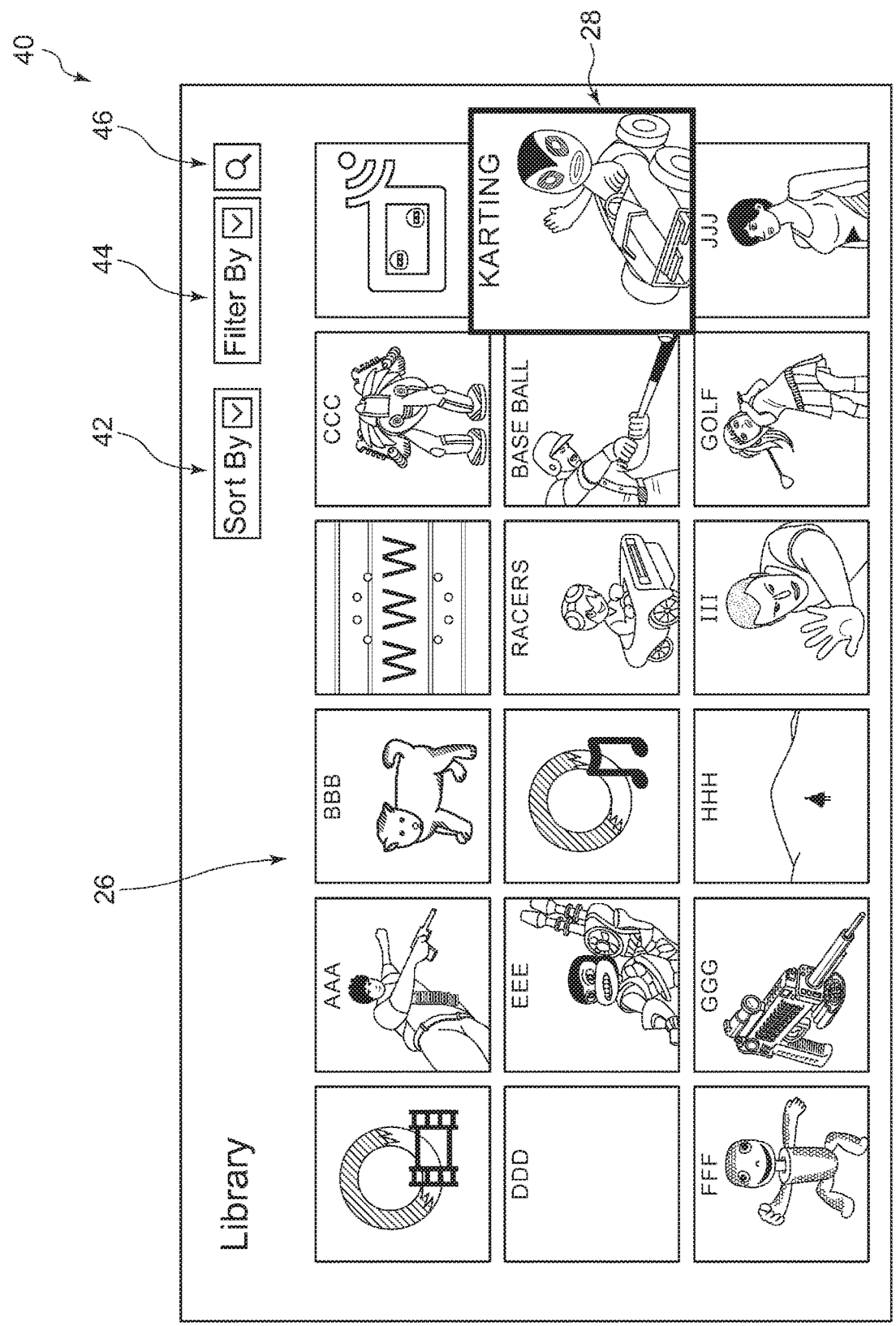
FIG. 7 shows a library screen.

FIG. 7 shows a library screen 40. The library screen is a search screen that assists a user to search for (or discover) a desired item of content or a desired application among multiple items of content and applications. The library screen generating unit 310 acquires, from the screen data storage unit 262, multiple content icons representing multiple items of content available for the user. The library screen generating unit 310 then generates the library screen 40 on which multiple content icons 26 are arranged in multiple rows. The library screen generating unit 310 typically arranges multiple icon rows over the entire area of the library screen 40 and arranges multiple content icons and application icons in each of the icon rows.

In the example of FIG. 7, three icon rows are displayed, and six content icons 26 are arranged in each row. Namely, 18 content icons 26 are concurrently displayed on the library screen 40 as a whole. On the library screen 40, the new information icon 30 and library icon 38 are not displayed in the icon rows. Since the new information icon 30 is automatically placed in the focus state when the home screen 10 is initially displayed, the user can easily find the new information icon 30.

The library screen generating unit 310 also displays a sort icon 42, a filter icon 44, and a search icon 46 on the library screen 40. The sort icon 42 is selected to display multiple content icons 26 sorted according to a certain sort condition (such as in alphabetical order, release dates, purchase dates, and execution dates). The filter icon 44 is selected to reduce the number of items of content displayed on the library screen 40 according to a certain filtering condition (such as a genre of games). The search icon 46 is selected to search for and display an item of content that meets a search condition entered by the user (such as content having a title coincident with the input character string).

When such an icon is selected, the library screen generating unit 310 performs a sorting process, a filtering process, or a search process, related to the selected icon. According to the execution result of the process, the library screen generating unit 310 changes the arrangement of content icons 26 on the library screen 40 so as to generate a new library screen 40.

The library screen generating unit 310 also arranges the focus frame 28 and updates, according to operation input in the direction of up, down, left, or right provided by the user, the display position of the focus frame 28 by moving the focus frame 28 in the same direction as the input direction. Namely, although the position of the focus frame 28 is fixed and content icons 26 are moved on the home screen 10, the positions of content icons 26 are fixed and the focus frame 28 is moved on the library screen 40.

In the example of FIG. 7, the user can check 18 content icons 26 at the same time and perform sorting, filtering, or a search, as needed, to find a desired item of content. When a certain content icon 26 is brought into focus and a determination operation is provided, the live information screen generating unit 312 displays the related information screen 50 instead of the library screen 40.

[Related Information Screen]

Referring back to FIG. 4, the live information screen generating unit 312 includes a related information screen generating unit 314 for generating the related information screen 50 and a new information screen generating unit 316 for generating the new information screen 60.

When a certain content icon 26 is brought into focus in the content area 14 on the home screen 10 and operation input indicating the downward direction is provided, the related information screen generating unit 314 generates the related information screen 50 on the subject of the focus content. The display control unit 290 then displays the related information screen 50 instead of the home screen 10. The focus icon here is a content icon or an application icon other than the new information icon 30 and the library icon 38, such as an icon showing a thumbnail of a certain game.

When a certain content icon 26 is brought into focus on the library screen 40 and operation input indicating determination is provided, the related information screen generating unit 314 also generates the related information screen 50 on the subject of the focus content.

Figure 8:
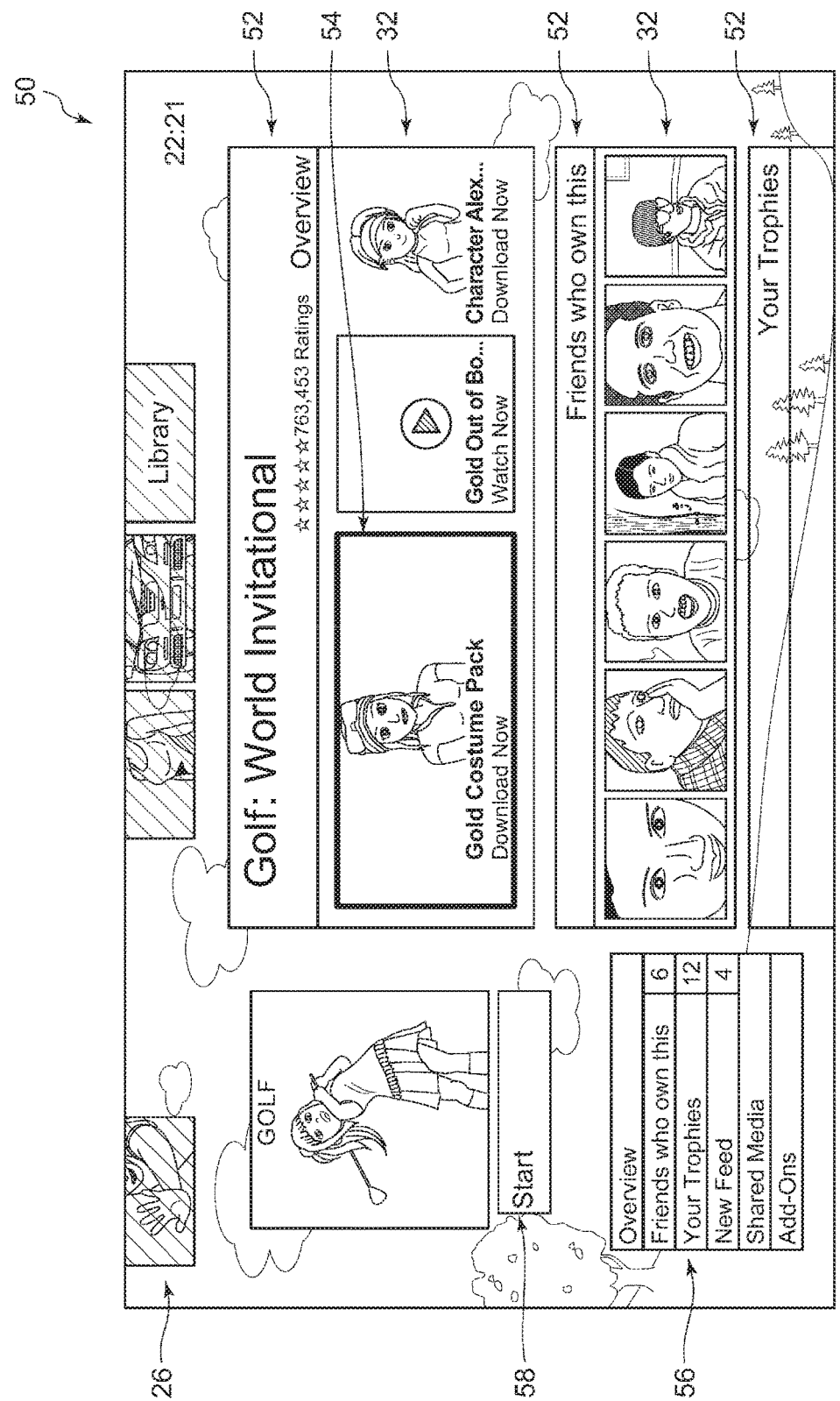
FIG. 8 shows a related information screen.

FIG. 8 shows the related information screen 50. The related information screen generating unit 314 sets, as the background of the related information screen 50, a predetermined background image for the subject content, which is also set as the background image of the content area 14 and live area 16 on the home screen 10. The related information screen 50 displays multiple live information items 32 related to the content selected by the user on the screen before the transition (focus content). A live information item 32 is information that is related, in advance, to the focus content and stored in the managing server 102, and indicates a related information summary acquired by the related information acquisition unit 274 from the managing server 102.

As stated previously, each of multiple related information summaries provided by the managing server 102 is assigned a category type in advance. The related information screen generating unit 314 sorts, by category, multiple live information items 32 corresponding to multiple related information summaries and arranges live information items 32 in each category within a corresponding category frame 52. In the example of FIG. 8, the category frames 52 for the categories of "Overview", "Friends who own this", and "Your trophies" are arranged in this order from the top of the screen.

The related information screen generating unit 314 also arranges a focus frame 54 and changes the display position thereof by moving the focus frame 54 according to directional input provided by the user. When a certain live information item 32 is brought into focus and a determination operation is provided, the related information screen generating unit 314 generates a detailed information screen for presenting detailed related information associated with the focus item (or related information summary). The display control unit 290 then displays the detailed information screen instead of the related information screen 50.

For example, when a determination operation for a live information item 32 in the "Overview" category is provided, the related information acquisition unit 274 may acquire, as detailed related information, web page data of a store site (such as the data of a purchase page for a costume pack for a game character). Also, when a determination operation for a live information item 32 in the "Friends who own this" category is provided, the related information acquisition unit 274 may acquire, as detailed related information, web page data of the profile of the friend user. In any case, the related information screen generating unit 314 generates, as a detailed information screen, a screen on which web page data acquired by the related information acquisition unit 274 is provided, and displays the screen thus generated.

The related information screen generating unit 314 also arranges a category list 56, which is a list of multiple categories for live information items 32, at the lower left of the screen. With regard to the categories of "Friends who own this", "Your trophies", and "New feed", the related information screen generating unit 314 counts the number of live information items 32 that belong to the category and presents the number in the corresponding category area in the category list 56. The category list 56 functions as a table of contents for the related information screen 50. When the user brings into focus a category in the category list 56 and inputs a determination operation, the related information screen generating unit 314 updates the position of each category frame 52 so that the category frame 52 for the category selected by the user is displayed at the highest position (at the top) among the category frames 52 on the related information screen 50.

The related information screen generating unit 314 also arranges, on the top of the related information screen 50, the same icon row as shown on the home screen 10 but displays each content icon 26 therein with visibility lower than that on the home screen 10. For example, the content icons 26 may be displayed with lower brightness, displayed with higher transparency, or displayed in grayout. When operation input indicating the upward direction is provided on the related information screen 50, the home screen 10 is displayed again instead of the related information screen 50.

Further, the related information screen generating unit 314 arranges an action icon 58 on the related information screen 50. When the user brings the action icon 58 into focus and inputs a determination operation, the content execution unit 280 starts the execution of the content set as the subject on the related information screen 50. The character string provided in the action icon 58 corresponds to the action indicator 36 on the home screen 10. In FIG. 8, "Start" is displayed because the golf game set as the subject on the related information screen 50 is already installed on the game console 200.

When the installation status of the content set as the subject on the related information screen 50 is "not installed" or "not downloaded", the related information screen generating unit 314 may provide the character string of "Install" or "Download" in the action icon 58. In such a case, when a determination operation for the action icon 58 is provided, the content execution unit 280 may start downloading of the content data from an external device or may start installation of the content data.

[New Information Screen]

Figure 9:
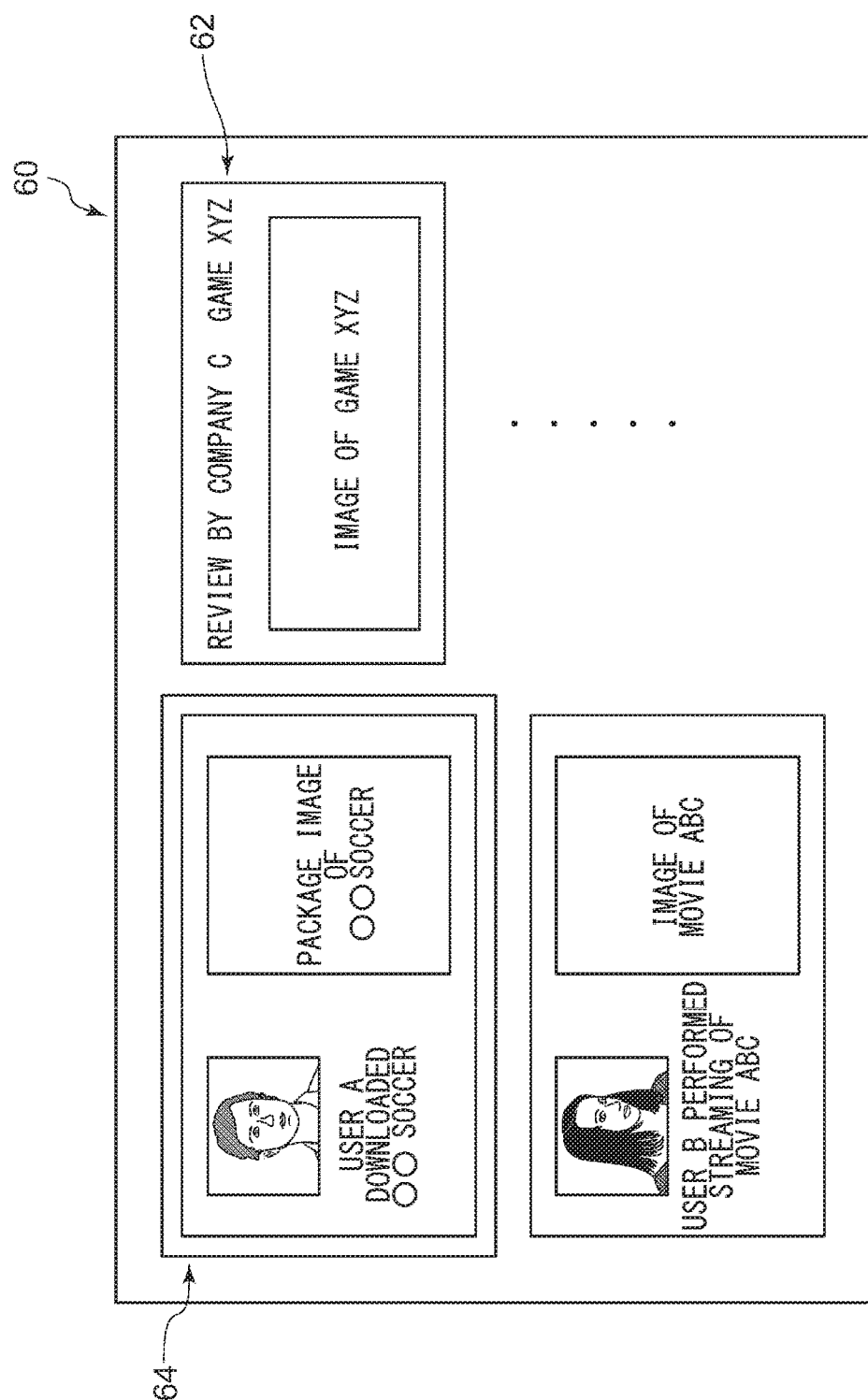
FIG. 9 shows a new information screen.

When the new information icon 30 is brought into focus in the content area 14 on the home screen 10 and operation input indicating the downward direction is provided, the new information screen generating unit 316 generates a new information screen 60. The display control unit 290 then displays the new information screen 60 instead of the home screen 10. FIG. 9 shows a new information screen 60. A new information item 62 is new information acquired by the new information acquisition unit 276 from the managing server 102. More specifically, new information items 62 correspond to related information summaries associated with multiple items of content, and the related information summaries have been stored as new information in the managing server 102 and provided from the managing server 102 to the game console 200 as new information. The new information screen generating unit 316 arranges such new information items 62 associated with multiple items of content on the new information screen 60.

New information may be information indicating the fact that a friend user has downloaded or purchased an item of content. It may also be information indicating the fact that a friend user has performed streaming of an item of content. It may also be review (evaluation) information for an item of content provided by a user or an enterprise. It may also be information indicating the fact that a friend user has posted "Great" for an item of content (by pressing a "Like" button, for example). Further, it may also be information indicating an item of content currently executed by a friend user (such as a game currently played).

The new information screen generating unit 316 also arranges a focus frame 64 and changes the display position thereof by moving the focus frame 64 according to directional input provided by the user. When a certain new information item 62 is brought into focus and a determination operation is provided, the related information screen generating unit 314 generates a detailed information screen for presenting detailed related information associated with the focus item (or related information summary). The display control unit 290 then displays the detailed information screen instead of the new information screen 60. For example, when a determination operation is provided in the example of FIG. 9, the related information acquisition unit 274 may acquire, as detailed related information, a web page of a store site (such as a purchase page for "oo soccer"). The related information screen generating unit 314 may then generate, as a detailed information screen, a screen on which web page data acquired by the related information acquisition unit 274 is provided, and display the screen thus generated.

[System Screen and System Function Execution Screen]

Referring back to FIG. 4, the system screen generating unit 318 generates the system screen 70 when operation input indicating the upward direction is provided on the home screen 10. The display control unit 290 then displays the system screen 70 instead of the home screen 10. The system screen generating unit 318 includes a function icon setting unit 320 and an execution result extracting unit 322.

Figure 10:
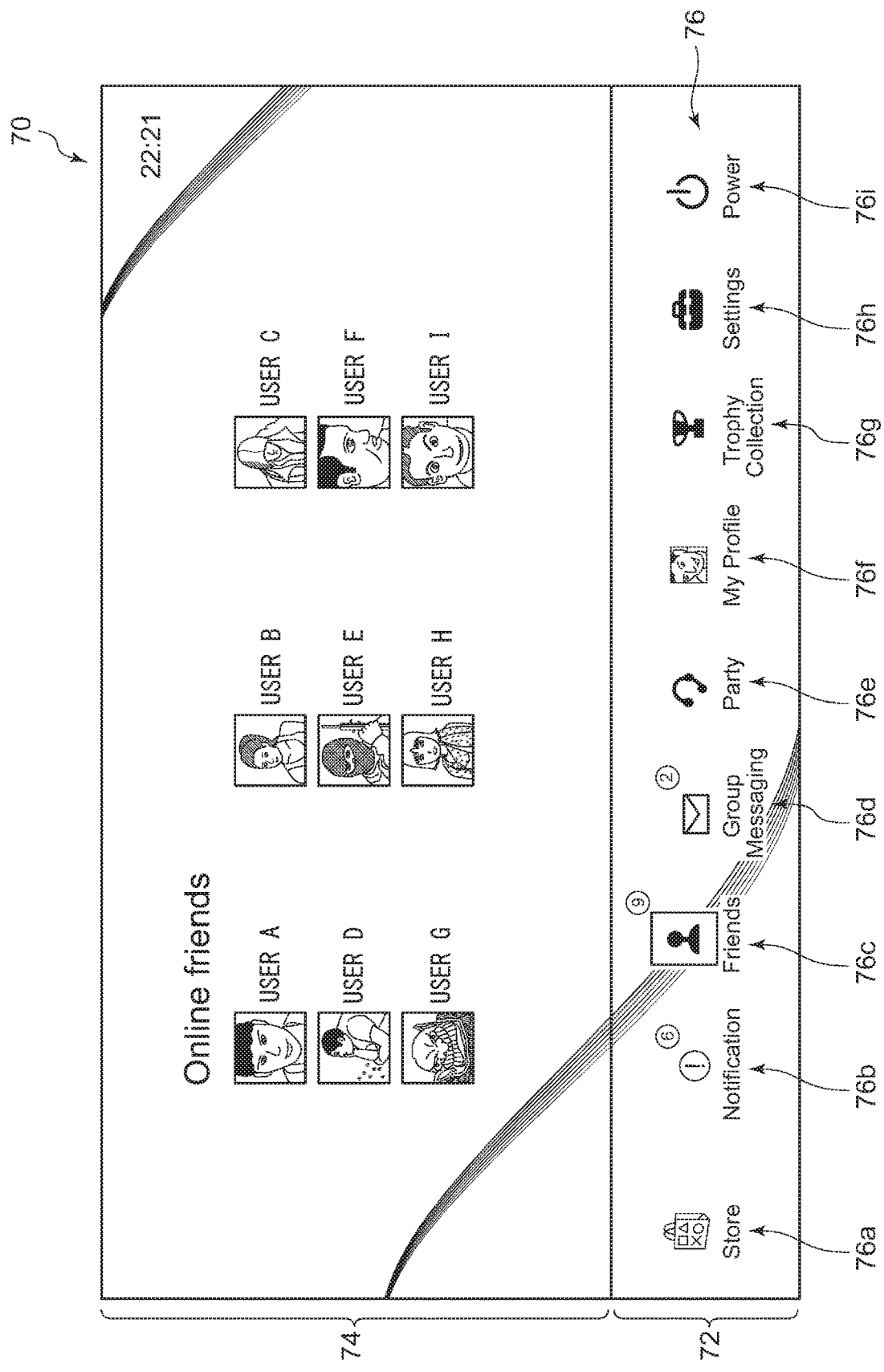
FIG. 10 shows a system screen.

FIG. 10 shows the system screen 70. The system screen generating unit 318 sets, as the background of the system screen 70, a predetermined background image, which is also set as the background image of the system area 12 on the home screen 10. The function icon setting unit 320 arranges and displays, in a system function selection area 72 on the system screen 70, multiple system function icons 76 representing multiple system functions provided by the game console 200.

The system function icons 76 include the store icon 76a, the notification icon 76b, the friend icon 76c, a group message icon 76d, a party icon 76e, the profile icon 76f, the trophy icon 76g, a setting icon 76h, and a power icon 76i. The function icon setting unit 320 serially changes the system function icon 76 brought into focus according to operation input in a lateral direction provided by the user and provides the setting of displaying the focus icon in a highlighted mode (in a larger size or in a different color, for example). In FIG. 10, the friend icon 76c is brought into focus and highlighted more than the other icons.

When the user provides an operation in a lateral direction to bring a desired icon into focus and inputs a determination operation, the system function execution unit 284 performs a system function corresponding to the focus icon. The system functions in the embodiment include a store site viewing function, a notification viewing function, a friend viewing function, a group message viewing function, a party function (typically a voice chat function), a profile editing function, a trophy viewing function, a system setting function, and a power setting function. The system function execution screen generating unit 324 generates a system function execution screen for presenting an execution result of a system function performed by the system function execution unit 284. The display control unit 290 then displays the system function execution screen instead of the system screen 70.

The function icon setting unit 320 also sets, for each of multiple system function icons 76, an indicator for presenting the number of data or the number of records and arranges such an indicator in association with the corresponding system function icon 76. For example, the function icon setting unit 320 identifies the number of unread notifications with reference to unread flags for notification data stored in the notification data storage unit 268. The function icon setting unit 320 then arranges an unread notification count indicator, which indicates the number of unread notifications, near the notification icon 76b. Similarly, the function icon setting unit 320 arranges an online count indicator, which indicates the number of friends online, near the friend icon 76c and also arranges an unread message count indicator, which indicates the number of unread group messages, near the group message icon 76d.

There will be described examples of the system function execution screen. For example, when a determination operation for the store icon 76a is provided, the system function execution screen generating unit 324 displays the top page of a store site. When a determination operation for the notification icon 76b is provided, the system function execution screen generating unit 324 displays a notification viewing screen 90, which will be described later. When a determination operation for the friend icon 76c is provided, the system function execution screen generating unit 324 displays a friend viewing screen 80, which will be described later. When a determination operation for the group message icon 76d is provided, the system function execution screen generating unit 324 displays a group message viewing screen. Group messaging is a function to exchange messages between multiple users, and, on the group message viewing screen, one or more messages exchanged between users are arranged in chronological order and displayed.

When a determination operation for the party icon 76e is provided, the system function execution screen generating unit 324 displays, as a system function execution screen, a screen showing a list of voice chat groups. Similarly, when a determination operation for the profile icon 76f is provided, a profile setting screen is displayed; when a determination operation for the trophy icon 76g is provided, a trophy viewing screen is displayed; and, when a determination operation for the setting icon 76h is provided, a setting screen for the game console 200 is displayed. Further, when a determination operation for the power icon 76i is provided, a power setting screen (such as a screen for ordering shutdown or restart of the game console 200) is displayed.

When a certain system function icon 76 is brought into focus, the execution result extracting unit 322 provides, in a preview area 74 on the system screen 70, a part of the contents of a system function execution screen that is displayed when the user provides a determination operation for the focus icon. Namely, when a certain system function icon 76 is brought into focus, the execution result extracting unit 322 previews, in the preview area 74, an execution result of a system function represented by the focus icon, even if the user has not input a determination operation yet.

The execution result extracting unit 322 may display, in the preview area 74, so-called new information among the execution results of a system function. The new information may be information that has not been read or checked by the user or may be information of which the acquisition date and time or the provision date and time, on which the information was acquired from or provided by the managing server 102, is relatively new. Among multiple pieces of information indicating the execution results of a system function, the execution result extracting unit 322 may preferentially arrange information indicating a newer date and time (such as the generation date and time or the update date and time on which the information was generated or updated in the game console 200, or the acquisition date and time or the provision date and time on which the information was acquired from or provided by the managing server 102) or may arrange a certain number of pieces of information indicating newer dates and times, in the preview area 74.

Figure 11:
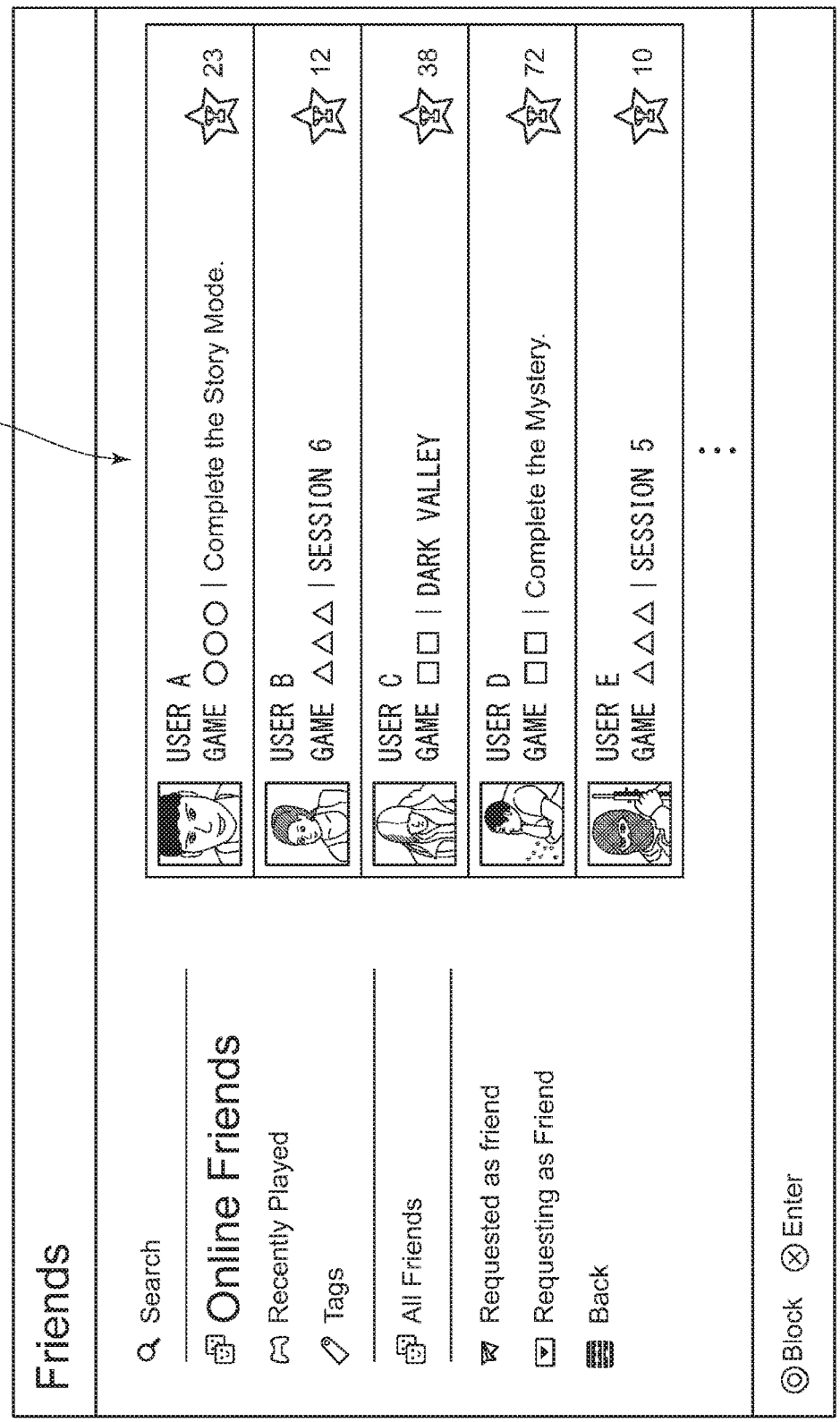
FIG. 11 shows a friend viewing screen.

FIG. 11 shows a friend viewing screen 80. When the friend icon 76*c* is brought into focus on the system screen 70, the system function execution unit 284 acquires, from the managing server 102, information on friend users who are currently online. Thereafter, when a determination operation is provided while the friend icon 76*c* is in the focus state on the system screen 70, the system function execution screen generating unit 324 sets the data of the friend viewing screen 80 on which pieces of information on friend users are arranged and displays the resulting screen. The friend viewing screen 80 displays a friend list 82 that provides information on multiple friend users. Each record of the friend list 82 shows a photo, a user name (the real name or a login user name used to log in the managing server 102), and a player name in a game of the friend user, the name of a game currently played by the friend user and the progress of the game, and the number of trophies won by the friend user.

Referring back to FIG. 10, when the friend icon 76*c* is brought into focus, the execution result extracting unit 322 in the system screen generating unit 318 extracts part of information on each friend user acquired by the system function execution unit 284 and displays the information thus extracted in the preview area 74. In the example of FIG. 10, a photo and a user name of each friend user are displayed.

[System Screen and Notification Viewing Screen]

Referring back to FIG. 4, the system function execution screen generating unit 324 includes a notification viewing screen generating unit 326. When the notification icon 76*b* is brought into focus on the system screen 70 and a determination operation is provided, the notification viewing screen generating unit 326 generates a notification viewing screen 90 on which notification data acquired by the notification acquisition unit 278 from the managing server 102 are arranged.

Figure 12:
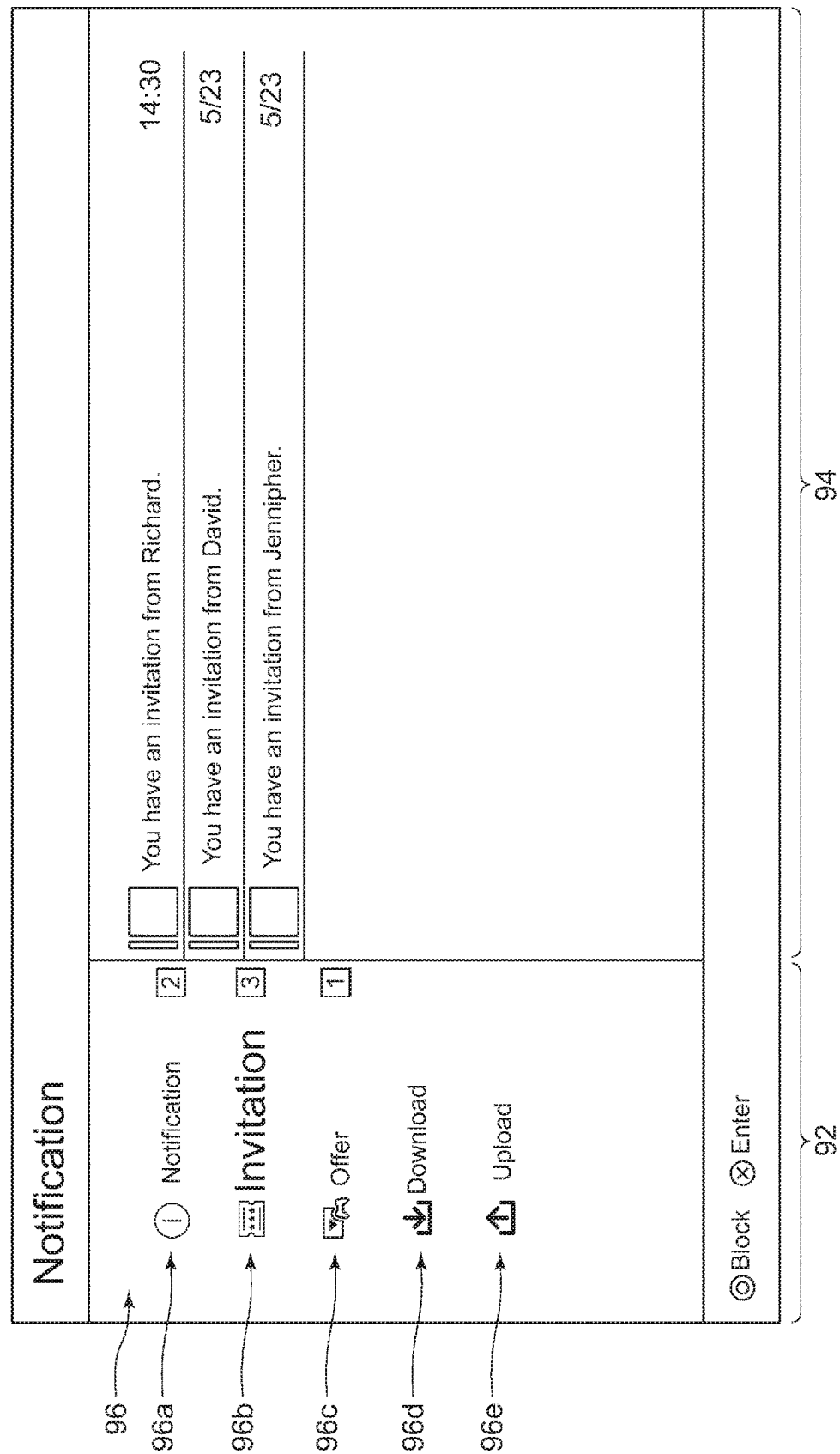
FIG. 12 shows a notification viewing screen.

FIG. 12 shows a notification viewing screen 90. The notification viewing screen generating unit 326 arranges, in a category selection area 92, multiple category tabs 96 that represent multiple categories predetermined for notifications. The category tabs 96 include a notification category tab 96*a*, an invitation category tab 96*b*, an offer category tab 96*c*, a download category tab 96*d*, and an upload category tab 96*e*. As shown in FIG. 12, the notification viewing screen 90 displays notification data for each category rather than concurrently displays multiple types of notification data for multiple categories. In other words, when a certain category is selected, the notification viewing screen 90 only displays notifications that belong to the selected category.

When the notification viewing screen 90 is initially displayed, or when the user has not selected any category tab 96, the notification viewing screen generating unit 326 autonomously places the invitation category tab 96*b* in a selected state and highlights the tab. The notification viewing screen generating unit 326 then autonomously arranges and displays, in a notification list area 94, notification data to which category information indicating the invitation category is added, among multiple types of notification data acquired from the managing server 102.

This is because a notification in the invitation category typically prompts the user to participate in an online game and has a time constraint tighter than a notification in other categories. A user who sent an invitation needs to confirm the invited user's intention of participating and can hardly wait for an invited user who is slow to express the intention. Accordingly, if an invited user wishes to participate in the online game, the user needs to take necessary procedures for participation within a short time (such as within 10 minutes). Thus, it is considered that a notification in the invitation category is more important to the user and needs to be checked more urgently, in comparison with a notification in other categories. In other words, it is considered that the invitation category is relatively important among the multiple categories. Therefore, the notification viewing screen generating unit 326 displays notifications in the invitation category on the notification viewing screen 90 by default, so as to present the notifications to the user in preference to notifications in other categories.

As a modification, if there is assumed another category containing notifications that are even more important to the user and need to be checked even more urgently, the notifications in the category may be displayed in preference to notifications in the other categories including the invitation category, as a matter of course. For example, if there is provided an "Important notification" category that includes notifications of updating of various software programs or notifications from the manager of the managing server 102, the notifications in the "Important notification" category may be preferentially displayed, in the same way as notifications in the invitation category in the embodiment.

Figure 13:
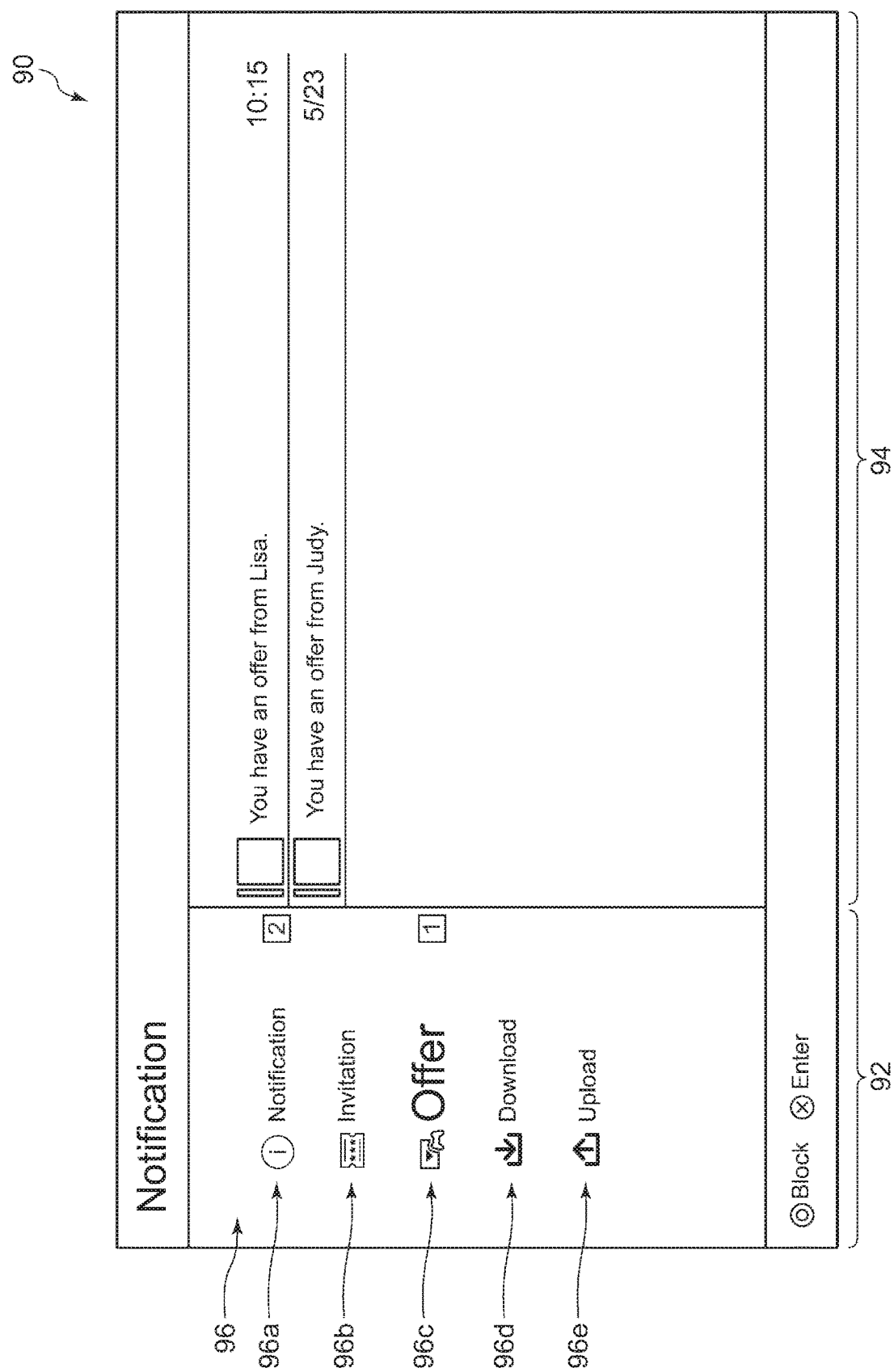
FIG. 13 also shows the notification viewing screen.

When the selected category acquisition unit 286 detects selection of a different category tab 96, the notification viewing screen generating unit 326 arranges, in the notification list area 94, notification data that belong to the category newly selected by the user, instead of the notification data that have been arranged in the notification list area 94. FIG. 13 also shows the notification viewing screen 90. FIG. 13 shows the state where the offer category tab 96*c* has been newly selected on the notification viewing screen 90 shown in FIG. 12.

As the notification data displayed for the download category on the notification viewing screen 90, information that indicates the download status of content stored in the game console 200 itself may also be used, instead of data acquired from the managing server 102. The same applies to the notification data displayed for the upload category on the notification viewing screen 90.

Figure 14:
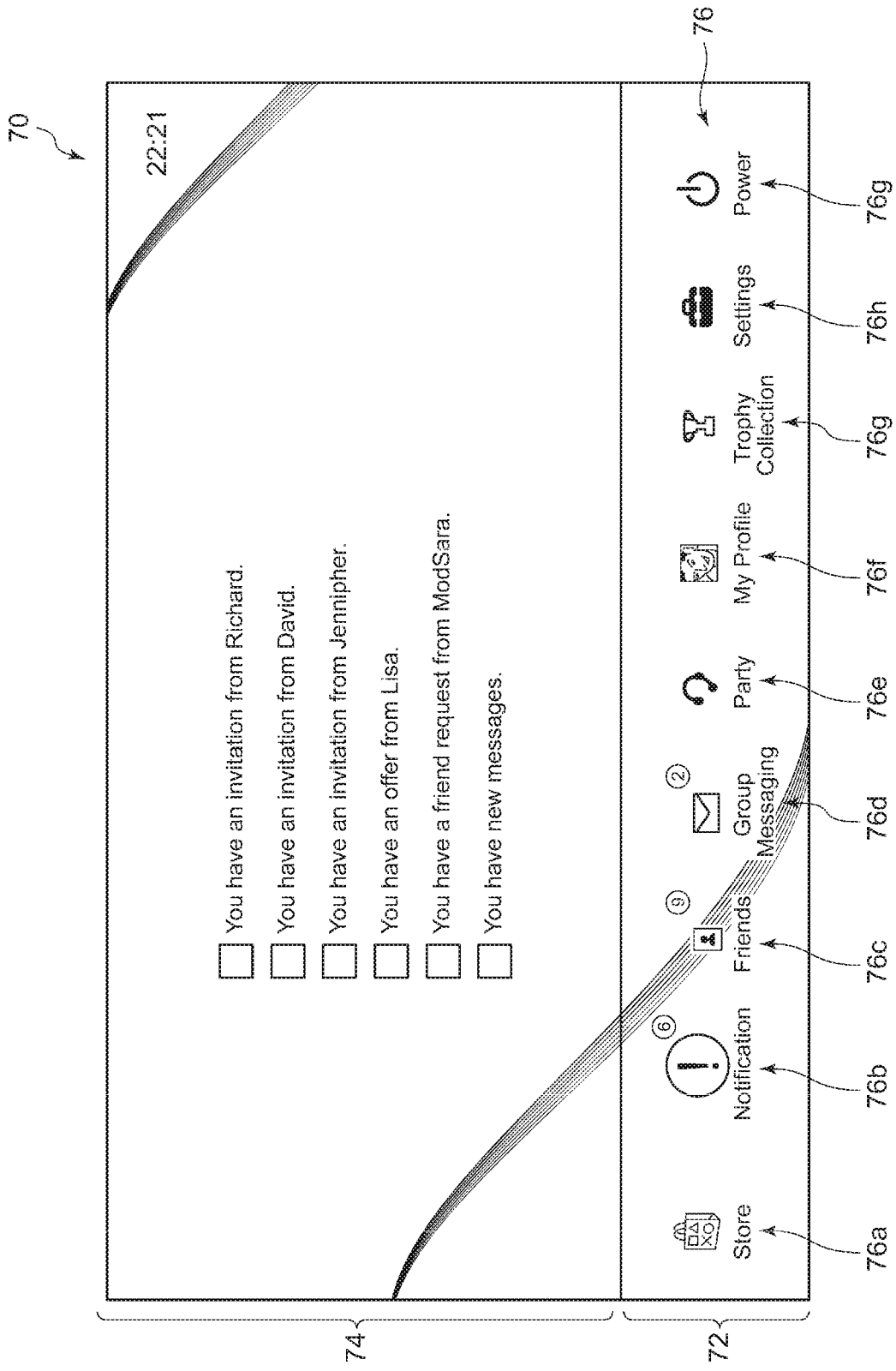
FIG. 14 also shows the system screen.

FIG. 14 also shows the system screen 70. FIG. 14 shows the state where the notification icon 76*b* is selected. The execution result extracting unit 322 provides, in the preview area 74, part of the information displayed on the notification viewing screen 90, or more specifically, unread notifications. Among multiple unread notifications, the execution result extracting unit 322 displays notifications in the invitation category, which is defined as the priority category, in preference to notifications in the other categories. More specifically, the execution result extracting unit 322 arranges, in the preview area 74, notifications in the invitation category in a predetermined mode with relatively high visibility from the user.

In the example of FIG. 14, notifications in the invitation category are arranged in an upper position than notifications in the other categories in the preview area 74. The notifications in categories other than the invitation category are arranged in descending order of acquisition date and time of the notification (which may be another date and time related to the notification, such as the transmission date and time of the notification). As another example, notifications in the invitation category may be displayed in boldface or in a highlighted color. If there is an upper limit in the number of notifications to be displayed due to the size of the preview area 74, a limited number of notifications in the other categories may be displayed while notifications in the invitation category are always displayed.

Referring back to FIG. 4, the content execution screen generating unit 328 generates data of a screen that presents a result of execution or playing of content performed by the content execution unit 280. For example, the content execution screen generating unit 328 generates a game screen displayed full-screen on the television monitor 204. The items of content executed or played by the content execution unit 280 include various application data (such as music tracks and movies) besides games. Accordingly, the data provided by the content execution screen generating unit 328 on the screen may be a result of execution or playing of various application data.

Figure 15:
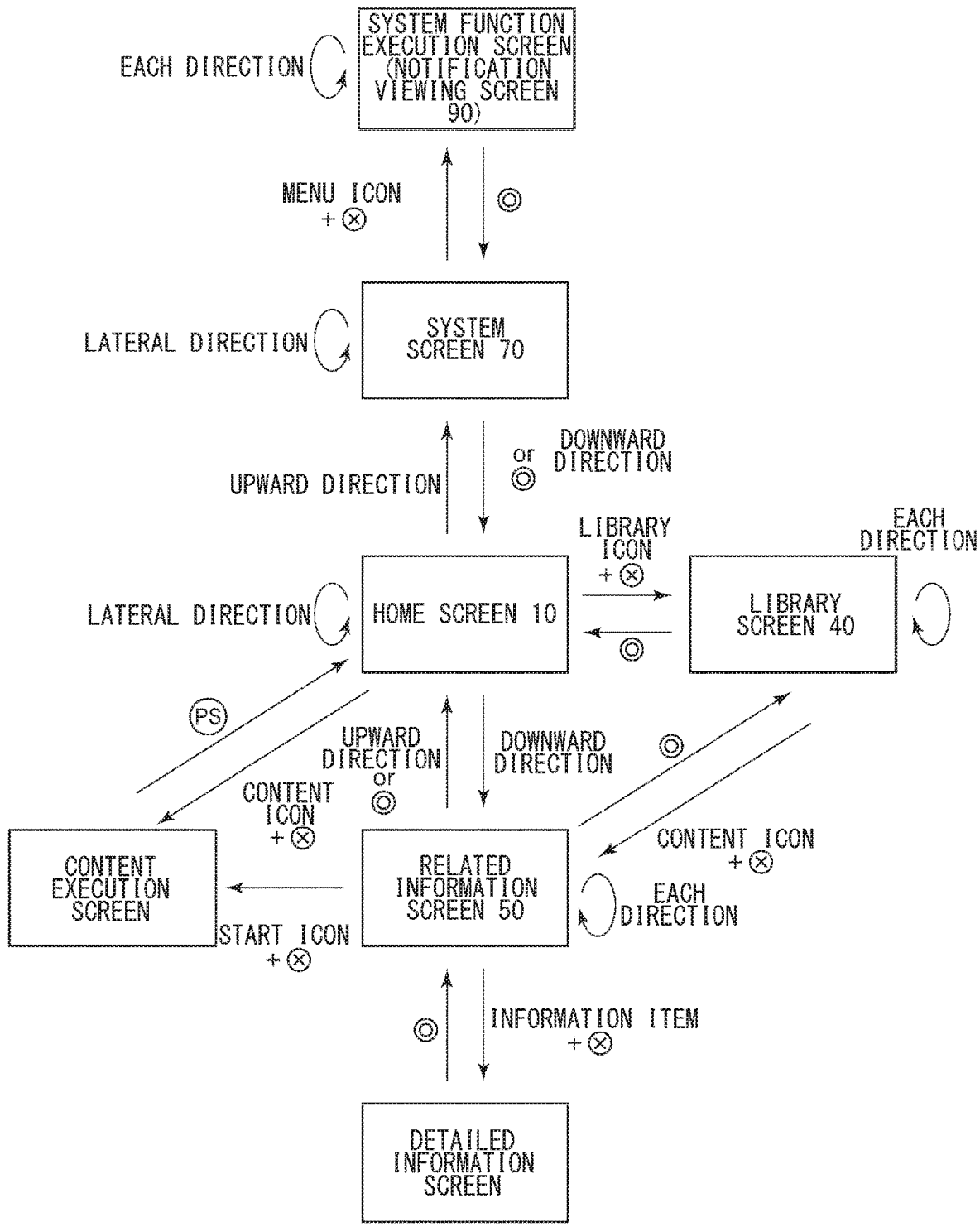
FIG. 15 is a screen transition diagram.

There will now be described the operations performed by the game console 200 having the configuration set forth above, with reference to a screen transition diagram shown in FIG. 15. FIG. 15 schematically shows screen transition rules that are stored in the transition data storage unit 264 and referred to by the screen transition control unit 288.

First, a user activates the game console 200 (including turning on the power of the game console 200 and activating the OS on the game console 200). The home screen generating unit 300 generates the data of the home screen 10, which is the first screen displayed after the activation, and the display control unit 290 displays the home screen 10 on the television monitor 204. Hereinafter, the process in which the screen generating unit 287 generates screen data and the display control unit 290 displays the screen on the television monitor 204 may also be simply referred to as "displaying a screen".

The content icon setting unit 302 arranges, in the content area 14 on the home screen 10, a list in which multiple content icons 26 are aligned, or an icon row. The content icons 26 include icons representing items of content available for the user and icons representing applications available for the user. The content icon setting unit 302 arranges the new information icon 30 at the top of the icon row, arranges content icons 26 from the second position in the icon row in descending order of access date and time on which the user accessed the content or application, and arranges the library icon 38 at the tail of the icon row. With regard to the new information icon 30 at the top, the content icon setting unit 302 arranges it within the focus frame 28, so as to place the new information icon 30 in the focus state by default.

The new information acquisition unit 276 acquires multiple related information summaries that are stored as new information in the managing server 102 and are associated with multiple types of items of content. The live information extracting unit 304 arranges, in the live area 16, a part of multiple pieces of acquired new information, as live information items 32. The background setting unit 308 sets the background image on the system screen 70 as the background of the entire home screen 10.

Upon detection of operation input in the left or right direction on the home screen 10, the content icon setting unit 302 scrolls the icon row and serially changes the focus content. When a certain content icon is placed in the focus state, the related information acquisition unit 274 acquires, from the managing server 102, multiple related information summaries related to the focus content. The live information extracting unit 304 arranges, in the live area 16, a part of multiple related information summaries thus acquired, as live information items 32.

Merely because a content icon is placed in the focus state, the content execution unit 280 does not start the execution or playing of the content. Namely, the playing of the focus content does not start at the time when content related information is displayed on the home screen 10 or the related information screen 50. This reduces the processing load on the game console 200 at the time when the final determination of the content to be played is not provided yet. In other words, the execution of unnecessary data processing can be restrained.

The background setting unit 308 sets, as the background of the content area 14 and the live area 16 on the home screen 10, a background image related, in advance, to the focus content. Meanwhile, the background setting unit 308 continuously sets the background image on the system screen 70 as the background of the system area 12 on the home screen 10.

In this way, the background of the content area 14 and live area 16 is sequentially changed according to changes of the focus content, which suggests to the user that the content area 14 and the area therebelow are areas for presenting content information. Also, the background of the system area 12 is continuously set to the background of the system screen 70 irrespective of changes of the focus content, which suggests to the user that the system area 12 is an area for presenting information on the system functions. Accordingly, a user who wishes to view content information is prompted to provide operation input indicating the downward direction, whereas a user who wishes to use a system function is prompted to provide operation input indicating the upward direction, thereby assisting the user to provide intuitive operation on the home screen 10.

Next, while scrolling the icon row on the home screen 10, the user searches the icon row for an icon of content to be executed on the game console 200. When the user finds a desired item of content, the user brings the corresponding content icon 26 into focus and presses the cross button 226. Accordingly, the content execution unit 280 starts the execution of the focus content and provides data indicating the execution results to the content execution screen generating unit 328. The content execution screen generating unit 328 then generates a content execution screen for presenting an execution result of the content. The screen transition control unit 288 controls the display control unit 290 to display the content execution screen instead of the home screen 10.

Thus, on the home screen 10, related information of the focus content is previewed, and, when a determination operation for the focus content is provided, the execution of the focus content is started. This allows a user to check at least part of the related information of the focus content and also assists a prompt start of the execution of desired content.

Also, on the home screen 10, icons for items of electronic content including games and icons for applications including a music player and a web browser are arranged in the same icon row. When the home screen 10 is initially displayed, a content icon or an application icon with a newer access date and time, on which the user accessed the content or application, is arranged closer to the focus frame 28. Accordingly, the user can select an icon with a newer date and time of use more quickly, irrespective of whether the icon is for electronic content, such as a game, or for an application, such as a music player or a web browser. For example, when the user replays a game that the user has recently played, the user can start the game with few steps of activating the game console 200 to display the home screen 10, pressing the right direction indicator key of the direction key 216 once, and pressing the cross button 226.

Upon detection of pressing of the PS button 236 while a content execution screen is displayed, the screen transition control unit 288 controls the display control unit 290 to display the home screen 10 again instead of the content execution screen. When the screen is switched back from a content execution screen to the home screen 10 upon pressing of the PS button 236, the data of the content execution screen displayed before the transition may be saved in a certain storage area, and the content execution unit 280 may continue the execution of the content. In this case, when the PS button 236 is pressed again while the home screen 10 is displayed, the screen transition control unit 288 controls the display control unit 290 to redisplay the content execution screen for the content currently executed, instead of the home screen 10.

Next, while scrolling the icon row on the home screen 10, or changing the live information items 32 in the live area 16, the user searches the icon row for an icon representing an item of content of which the related information is to be viewed. When the user finds a desired item of content, the user inputs the downward direction on the direction key 216 while the item of content is placed in the focus state.

In response to the user's operation, the related information screen generating unit 314 generates the related information screen 50. More specifically, the related information screen generating unit 314 arranges, for each category on the related information screen 50, multiple live information items 32 that present multiple related information summaries related to the focus content, which have been acquired by the related information acquisition unit 274 from the managing server 102. The related information screen generating unit 314 also arranges, on the top of the related information screen 50, the icon row displayed on the home screen 10 but displays the icon row with visibility lower than that on the home screen 10. Thereafter, the screen transition control unit 288 controls the display control unit 290 to display the related information screen 50 instead of the home screen 10.

When the user inputs the downward direction on the direction key 216 while the new information icon 30 is placed in the focus state on the home screen 10, the new information screen generating unit 316 generates the new information screen 60. More specifically, the new information screen generating unit 316 arranges, on the new information screen 60, multiple new information items 62 that present multiple pieces of new information acquired by the new information acquisition unit 276 from the managing server 102. The screen transition control unit 288 then controls the display control unit 290 to display the new information screen 60 instead of the home screen 10. When an operation indicating the upward direction is input while an item arranged at the top is placed in the focus state on the related information screen 50 or the new information screen 60, the screen transition control unit 288 controls the display control unit 290 to display the home screen 10 again instead of the related information screen 50 or new information screen 60. The same operation is also performed when the circle button 224 is pressed.

Thus, on the home screen 10, the focus frame 28 and an icon row are displayed substantially at the center of the screen as essential information for a content selection screen, and live information of the focus content is displayed in the lower part of the screen. In response to operation input in the downward direction, the screen is switched to the related information screen 50 or the new information screen 60. When the user wishes to check related information of the focus content, a desired related information screen 50 can be displayed by inputting an operation indicating a direction from the area where content is selected to the area where live information is displayed. In other words, by inputting a direction in which the user intuitively wants to move the focus frame 28 (although the focus frame 28 cannot actually be moved), the screen can be switched to a desired screen. Thus, an intuitive operational interface can be provided to the user.

Similarly, on the related information screen 50, the icon row shown on the home screen is displayed on the top of the screen, and, in response to operation input in the upward direction, the screen is switched to the home screen 10. When the user wishes to return to the home screen 10, the home screen 10 can be displayed by inputting an operation indicating a direction from the area where a live information item 32 is selected to the area where the icon row is displayed. In other words, by inputting a direction in which the user intuitively wants to move the focus frame 54, the screen can be switched to a desired screen. Thus, an intuitive operational interface based on the arrangement of information can be provided to the user.

In the embodiment, the focus frame 28 on the home screen 10 cannot be moved upward or downward, or in other words, the focus frame 28 cannot moved to areas other than the content area 14, as stated previously. However, as a modification, the focus frame 28 may be moved between different areas. Upon detection of a user's operation ordering a move of the focus frame 28 from the content area 14 to the live area 16, the screen transition control unit 288 may control the display control unit 290 to display the related information screen 50 instead of the home screen 10. In the same way, upon detection of a user's operation ordering a move of the focus frame 28 from the content area 14 to the system area 12, the screen transition control unit 288 may control the display control unit 290 to display the system screen 70 instead of the home screen 10. According to this modification, an intuitive operational interface can also be provided to the user in the case where the focus frame 28 is moved between multiple areas within the screen.

Also, since the new information icon 30 is autonomously placed in a selected state at the top of the icon row when the home screen 10 is initially displayed, the user can easily check new information associated with multiple items of content, without being limited to a certain item of content.

Although items of content represented by content icons 26 are often already purchased by the user, when the new information icon 30 is selected, pieces of new information on various types of items of content besides purchased items are presented to the user. For example, information on an item of content currently played by a friend user may be presented, thereby prompting the user to purchase new content.

Next, the user moves the focus frame 54 on the related information screen 50 to bring into focus an item of which detailed information is to be checked and presses the cross button 226. The related information acquisition unit 274 then acquires, from the managing server 102, detailed related information associated with the focus item, and the related information screen generating unit 314 generates a detailed information screen on which pieces of detailed related information associated with the focus item on the related information screen 50 are arranged. Thereafter, the screen transition control unit 288 controls the display control unit 290 to display the detailed information screen instead of the related information screen 50. When the circle button 224 is pressed while the detailed information screen is displayed, the screen transition control unit 288 displays the related information screen 50 again instead of the detailed information screen. The same operation is also performed when the user inputs a determination operation for a new information item 62 on the new information screen 60.

When the user cannot find desired content in the icon row on the home screen 10, the user may bring into focus the library icon 38 at the right end in the icon row and press the cross button 226. The library screen generating unit 310 then generates the library screen 40 on which multiple content icons are arranged in multiple rows, though the icons are arranged in a single row on the home screen 10. Thereafter, the screen transition control unit 288 controls the display control unit 290 to display the library screen 40 instead of the home screen 10. When the circle button 224 is pressed while the library screen 40 is displayed, the screen transition control unit 288 displays the home screen 10 again instead of the library screen 40.

Next, the user moves the focus frame 28 on the library screen 40 to bring into focus a desired content icon 26 and presses the cross button 226. As with the case where an operation in the downward direction is input on the home screen 10, the related information screen generating unit 314 generates the related information screen 50 associated with the focus content on the library screen 40. The screen transition control unit 288 then controls the display control unit 290 to display the related information screen 50 instead of the library screen 40. When the circle button 224 is pressed while the related information screen 50 is displayed, the screen transition control unit 288 controls the display control unit 290 to display the library screen 40 again instead of the related information screen 50.

Thus, the library icon 38 is arranged within the icon row and, when the user selects the library icon 38, the library screen 40, which concurrently presents more content icons 26 than the home screen 10, is displayed. This assists the user to find desired content. Also, since it is considered that the timing at which the user realizes that the user cannot find any desired content icon coincides with the time at which the user scrolls through the icon row to the end, it is preferable to arrange the library icon 38 at the tail of the icon row.

Instead of allowing the user to set the display format of content icons 26 in advance, a single icon row is displayed and the library icon 38 is arranged therein; upon selection of the library icon 38, the display format of the content icons 26 is changed. With such a configuration, the user only needs to select the library icon 38 within the icon row to change the display format of multiple content icons 26 and does not need to operate any part other than the icon row. Meanwhile, a user interface of the game console 200 used to select content is basically the home screen 10, and the user can easily check at least part of content related information (such as a related information summary in the "Overview" category) thereon.

When a determination operation for a content icon 26 on the home screen 10 is provided, the execution of the content is started and the screen is shifted to the content execution screen. On the other hand, when a determination operation for a content icon 26 on the library screen 40 is provided, the screen is shifted to the related information screen 50 without starting the playing of the content. The library screen 40 concurrently displays more content icons than the home screen 10, but, due to the limited display size, the live area 16 is not provided on the library screen 40 and live information items 32 are not displayed thereon. Accordingly, by restraining direct starting of content on the library screen 40 and starting the content after the screen is once shifted to the related information screen 50, the user can check the content related information.

In the embodiment, the library icon 38 is arranged at a predetermined position in the icon row. Accordingly, the user can always select the library icon 38 at the same position, as needed, such as when the user cannot find desired content. This prevents the situation where the user cannot find the library icon 38 itself and improves the user's convenience. The same can be said for the new information icon 30.

More specifically, the library icon 38 is arranged at an end (the top or the tail) of the icon row in the embodiment. The end of the icon row may be the top of the icon row displayed when the home screen 10 is initially displayed (or right after the screen transition is completed), which is the left end of the icon row in the example of FIG. 5. The end of the icon row may also be the tail of the icon row displayed after the icon row is scrolled through to the end, which is the right end of the icon row in the example of FIG. 6. The advantages of arranging the library icon 38 at the tail of the icon row are already stated. As an advantage of arranging the library icon 38 at the top, the following point can be provided. Namely, in the case where the user cannot find any desired content or application when the home screen 10 is initially displayed, or in the case where an icon to be selected is positioned in the last part of the icon row because the date and time of use of the desired content or application is old, the user may feel reluctant to scroll through the icon row to find the desired icon. Accordingly, if the library icon 38 is arranged at the top of the icon row, the user can promptly view the library screen 40, thereby saving the user the trouble.

In the embodiment, the new information icon 30 is also arranged at an end of the icon row. The advantages of arranging the new information icon 30 at the top of the icon row are already stated. As an advantage of arranging the new information icon 30 at the tail, the following point can be provided. Namely, there can be considered the situation where the user wishes to quickly play an item of content on the home screen 10 and may feel annoyed with the display of new information including advertisements. Accordingly, if the new information icon 30 is arranged at the tail of the icon row, new information can be presented to the user when the user wishes to view the new information, without interfering with the user's selecting an item of content.

When the user wishes to use a system function, the user inputs the upward direction on the direction key 216 while the home screen 10 is displayed. The system screen generating unit 318 then generates the system screen 70. Thereafter, the screen transition control unit 288 controls the display control unit 290 to display the system screen 70 instead of the home screen 10. When the user wishes to return to the home screen 10, the user inputs the downward direction on the direction key 216 or presses the circle button 224 while the system screen 70 is displayed. Accordingly, the screen transition control unit 288 controls the display control unit 290 to display the home screen 10 again instead of the system screen 70.

Thus, on the home screen 10, the focus frame 28 and an icon row are displayed substantially at the center of the screen as essential information for a content selection screen, and system function icons 76 are displayed in the upper part of the screen. In response to operation input in the upward direction, the screen is switched to the system screen 70. Namely, when the user wishes to use a system function, a desired system screen 70 can be displayed by inputting an operation indicating a direction from the area where content is selected to the area where system function icons 76 are displayed. In other words, by inputting a direction in which the user intuitively wants to move the focus frame 28 (although the focus frame 28 cannot actually be moved), the screen can be switched to a desired screen. Thus, an intuitive operational interface can be provided to the user.

When the system screen 70 is displayed, the function icon setting unit 320 arranges multiple system function icons 76 in the system function selection area 72 and places one of the system function icons 76 in the focus state. For example, the function icon setting unit 320 may memorize the last system function icon 76 brought into focus on the system screen 70 on the past and may autonomously place the system function icon 76 in the focus state when the screen is shifted to the system screen 70.

When a certain system function icon 76 is brought into focus on the system screen 70, the system function execution unit 284 performs a system function corresponding to the icon in the focus state. For example, the system function execution unit 284 may perform the same processing as performed when an actual determination operation for the focus icon on the system screen 70 is provided, or may perform reduced processing for acquiring data to be displayed in the preview area 74 on the system screen 70. The execution result extracting unit 322 then displays, in the preview area 74, information indicating an execution result of a system function performed by the system function execution unit 284.

It can be said that the information displayed in the preview area 74 is a part of the execution results of a system function performed by the system function execution unit 284 when an actual determination operation for a corresponding system function icon 76 on the system screen 70 is provided. It can also be said that such information is a part of the contents of a system function execution screen displayed when an actual determination operation for a system function icon 76 on the system screen 70 is provided.

The feature of providing the preview area 74 on the system screen 70 to present, in advance to the user, a part of execution results of each system function is embodiment of the concept of presenting, in advance to the user, information provided on a transition destination screen in the game console 200. This assists the user to efficiently determine the necessity of the execution of a system function. For example, if the information displayed in the preview area 74 is less important to the user, the user need not bother to display the system function execution screen, thereby saving the process of checking information on the system function execution screen.

Next, the user selects a desired system function icon 76 on the system screen 70 by providing operations in lateral directions. The function icon setting unit 320 changes the focus icon according to the operations in lateral directions. The system function execution unit 284 and the execution result extracting unit 322 repeat the process described above for each system function brought into focus, so as to update the information displayed in the preview area 74.

Next, the user presses the cross button 226 while a desired system function icon 76 is placed in the focus state. The system function execution unit 284 then performs the system function in the focus state. The system function execution screen generating unit 324 generates a system function execution screen for presenting an execution result of the system function. The screen transition control unit 288 then controls the display control unit 290 to display the system function execution screen instead of the system screen 70. When the user wishes to return to the system screen 70, the user presses the circle button 224 while the system function execution screen is displayed. Accordingly, the screen transition control unit 288 displays the system screen 70 again instead of the system function execution screen.

In the following, the operations for viewing notifications will be described.

The notification acquisition unit 278 receives notification data for which a push notification has been provided by the managing server 102 and stores, in the notification data storage unit 268, the notification data together with category information added thereto and an unread flag (set to ON when stored).

When the user brings the notification icon 76b into focus on the system screen 70, the system function execution unit 284 acquires notification data with the unread flag set to ON, among notification data stored in the notification data storage unit 268. Subsequently, the system function execution unit 284 provides the acquired notification data and the category information thereof to the execution result extracting unit 322. Among unread notification data, the execution result extracting unit 322 preferentially displays notification data that falls into the invitation category at an upper position in the preview area 74. The execution result extracting unit 322 then arranges and displays, under the notification data in the invitation category, pieces of notification data that fall into other categories in descending order of acquisition date and time on which the notification data was acquired from the managing server 102. This allows the user to easily recognize a notification considered to be relatively important, thereby improving the user's convenience.

When the user brings the notification icon 76b into focus on the system screen 70 and presses the cross button 226, the system function execution unit 284 acquires all the notification data stored in the notification data storage unit 268. The notification viewing screen generating unit 326 then generates the notification viewing screen 90 for presenting the notifications for each category. The screen transition control unit 288 controls the display control unit 290 to display the notification viewing screen 90 instead of the system screen 70.

On the notification viewing screen 90 initially displayed, the notification viewing screen generating unit 326 autonomously and automatically places the invitation category tab 96b in a selected state and arranges notifications in the invitation category in the notification list area 94 on the notification viewing screen 90. When the user selects another category tab 96 on the notification viewing screen 90, the notification viewing screen generating unit 326 changes the notifications arranged in the notification list area 94 so as to display notifications that belong to the newly selected category. When the user selects a notification in the notification list area 94, the notification viewing screen generating unit 326 sets and displays the detailed information of the selected notification in the notification list area 94. The system function execution unit 284 then sets the unread flag, stored in the notification data storage unit 268, for the notification of which the detailed information is displayed on the screen, to OFF.

Thus, notifications are displayed for each category on the notification viewing screen 90, so that the user can efficiently check a notification in a category important to the user or a category of interest. For example, if the user has no interest in offers from other users (such as an offer for a time trial of a race game) and does not select the offer category, the user need not bother to check notifications in the offer category. Also, it prevents the situation where the user cannot easily check notifications in other categories because of the presence (the display on the screen) of notifications in the offer category. Further, since notifications in the invitation category are autonomously displayed in preference on the notification viewing screen 90 initially displayed, the user can easily check a notification that is considered to be more important to the user and needs to be checked more urgently, among multiple categories.

Although not shown in FIG. 15, when the user presses the PS button 236 while a screen other than the home screen 10 of the game console 200 is displayed, the screen transition control unit 288 redisplays the home screen 10. Namely, regardless of the type of the screen currently displayed or the distance (or the number of screen transitions) from the home screen 10 to the screen currently displayed, the screen transition control unit 288 instructs the display control unit 290 to display the home screen 10 instead of the screen that has been displayed.

When the PS button 236 is pressed and the screen is switched back to the home screen 10, the screen transition control unit 288 stores the data of the transition source screen in the transition data storage unit 264. Thereafter, when the user presses the PS button 236 again while the home screen 10 is displayed, the screen transition control unit 288 redisplays the transition source screen based on the data of the transition source screen stored in the transition data storage unit 264. Thus, by pressing the cross button 226, screen transitions are performed by the game console 200 in steps toward a screen more distant from the home screen 10. Conversely, by pressing the circle button 224, screen transitions are performed in steps toward a screen closer to the home screen 10 (so-called historical back). In addition thereto, the game console 200 provides a direct transition function to shift between the home screen 10 and other screens by pressing the PS button 236.

The data of a transition source screen may include either or both of the identification information of the transition source screen and the screen data before the transition including images. For example, it is assumed here that the screen is switched back from the notification viewing screen 90 to the home screen 10 by pressing of the PS button 236 and, subsequently, the PS button 236 is pressed again while the home screen 10 is displayed. In this case, the screen transition control unit 288 may provide the screen data of the notification viewing screen 90 before the transition to the display control unit 290, so as to redisplay the notification viewing screen 90 before the transition. Alternatively, the screen transition control unit 288 may allow the notification viewing screen generating unit 326 to regenerate the notification viewing screen 90 based on the stored identification information of the notification viewing screen, so as to display the notification viewing screen 90 thus regenerated instead of the home screen 10.

The present invention has been described with reference to the embodiment. The embodiment is intended to be illustrative only, and it will be obvious to those skilled in the art that various modifications to constituting elements or processes could be developed and that such modifications also fall within the scope of the present invention.

A first modification will be described. Besides performing a system function according to a selecting operation by the user in the system function selection area 72 on the system screen 70, the system function execution unit 284 may perform a system function according to a selecting operation by the user in the preview area 74 on the system screen 70. Accordingly, the system function execution screen generating unit 324 may generate a system function execution screen for presenting an execution result of a system function performed by the system function execution unit 284, and the screen transition control unit 288 may control the display control unit 290 to display the system function execution screen instead of the system screen 70.

For example, when the user brings the notification icon 76b into focus and inputs a determination operation on the system screen 70 shown in FIG. 14, the notification viewing screen 90 as shown in FIG. 12 is displayed. Meanwhile, if the user brings into focus a certain notification in the preview area 74 and inputs a determination operation, the system function execution unit 284 may acquire the detailed information of the notification in the focus state, and the notification viewing screen generating unit 326 may display the notification viewing screen 90 for presenting the detailed information. In this way, it can be considered that, when the execution results of a system function is previewed in the preview area 74, the user may intend to directly select an information item in the preview area 74. Accordingly, by displaying a system function execution screen according to a selecting operation by the user in the preview area 74, a user interface adapted to the user's intuitive operation can be provided.

A second modification will be described. The content icon setting unit 302 in the aforementioned embodiment arranges the new information icon 30 at the top of the icon row on the home screen 10 and arranges the library icon 38 at the tail of the icon row. As a modification, the content icon setting unit 302 may fixedly arrange such icons at predetermined positions other than the top and the tail of the icon row. For example, the new information icon 30 and/or the library icon 38 may be arranged at the right end of the icon row displayed on the home screen 10, which corresponds to the position of the content "CCC" in the example of FIG. 5. In other words, the new information icon 30 and/or the library icon 38 may always be displayed at a fixed position in the icon row on the home screen 10. In this case, the content icon setting unit 302 always arranges the new information icon 30 and/or the library icon 38 at the fixed position, irrespective of operation input in a lateral direction provided by the user.

According to this modification, the new information icon 30 and/or the library icon 38 will always be displayed in the icon row on the home screen 10, thereby saving the user from finding such icons and thereby improving the user's convenience. In order to bring into focus the new information icon 30 and the library icon 38 displayed at a fixed position, the content icon setting unit 302 may provide control so that the new information icon 30 and the library icon 38 are placed in the focus state after the icon row is scrolled through to the content icon at the right end, for example.

A third modification will be described. In the aforementioned embodiment, the position of the focus frame 28 is fixed on the home screen 10. As a modification, when an operation in the left or right direction is input on the home screen 10 for a predetermined period of time or longer (such as for 500 milliseconds or longer), i.e., when the icon row is scroll-displayed, the content icon setting unit 302 may move the position of the focus frame 28 toward the center of the screen.

More specifically, when the icon row on the home screen 10 shown in FIG. 5 is scrolled, the position of the focus frame 28 may be moved to the right. The amount by which the focus frame 28 is moved to the right may be a length identical with or close to the width of a content icon 26. Accordingly, when the icon row is scroll-displayed, the number of content icons 26 displayed to the left of the focus frame 28 can be increased. For example, by moving the focus frame 28 to the right by the width of a content icon 26, two content icons 26 can be displayed to the left of the focus frame 28 (generally one content icon 26). Therefore, the user can easily check a content icon 26 that has passed through the focus frame 28 while the icon row is scrolled, thereby improving the user's convenience in selecting a content icon.

A fourth modification will be described.

Although not mentioned in the embodiment, the related information acquisition unit 274 may also regularly access the managing server 102 (such as every minute) after the related information screen 50 is displayed, so as to repeatedly acquire a latest related information summary from the managing server 102. Accordingly, the related information screen generating unit 314 may determine whether or not a related information summary acquired from the managing server 102 has been changed from the previously-acquired one (i.e., the related information summary currently displayed on the screen). If there has been a change, the related information screen generating unit 314 may update the screen so as to display the latest related information summary after the change as a live information item 32, instead of the related information summary that has been displayed. Accordingly, the latest live information can be presented to the user on the related information screen 50. The related information screen generating unit 314 may also change the display order of the multiple category frames 52 so as to display a category frame 52 containing a live information item 32 of which the contents have been updated, at the highest position among the category frames 52 on the related information screen 50.

A fifth modification will be described.

The content icon setting unit 302 in the aforementioned embodiment statically displays the library icon 38 at the tail of the icon row on the home screen 10. As a modification, when the operation input provided by the user on the home screen 10 coincides with an operation pattern predetermined as a typical operation pattern found when a user cannot find a desired icon, the content icon setting unit 302 may dynamically display the library icon 38 within the icon row on the home screen 10. The predetermined operation pattern may be an operation pattern considered to be found when a user searches for content for a long time. For example, the operation pattern may be five or more operations in total in the left and right directions or operation input for five seconds or longer in total, provided on the home screen 10 within a predetermined period of time, such as for ten seconds.

The content icon setting unit 302 then determines whether or not the operation input provided by the user on the home screen 10 coincides with the predetermined operation pattern as described above. If it is determined that the operation input coincides with the predetermined operation pattern, the content icon setting unit 302 will insert the library icon 38 between the content icons 26 currently displayed on the screen. Namely, the library icon 38 is made to dynamically appear within the icon row. According to this modification, the user need not find the library icon 38 to select it, thereby improving the user's convenience.

A sixth modification will be described.

Devices to which the user interface technique described in the aforementioned embodiment is applicable are not limited to game devices. For example, the technique described in the embodiment is also obviously applicable to other information devices provided with a touch screen, such as smartphones and tablet terminals. As an example, the home screen 10 may be displayed on a smartphone, and control may be provided so that, when a flick operation indicating a direction from the content area 14 to the system area 12 is detected on the home screen 10, the screen is switched to the system screen 70. Since it has a limited size of screen and has a larger restriction of information input, a smartphone or a tablet terminal is a suitable device to which the user interface technique described in the embodiment is applied.

Also, in the case of various information devices to which operations are input via a touch screen (including game devices, smartphones, and tablet terminals), control may be provided so that, when a flick operation indicating a direction from the system area 12 to the content area 14 is detected on the home screen 10, the screen is switched to the system screen 70, which is contrary to the case of the game console 200 in the embodiment. Similarly, control may be provided so that, when a flick operation indicating a direction from the live area 16 to the content area 14 is detected on the home screen 10, the screen is switched to the related information screen 50. According to this modification, the user can be given an intuitive operational feeling such that a screen transition from the home screen 10 to another screen, of which part of the information is displayed in advance on the home screen 10, is performed by pulling out the another screen.

It will be obvious to those skilled in the art that the function to be achieved by each constituent feature described in the claims may be implemented by each of the constituting elements described in the embodiment or modifications, or by the cooperation of those constituting elements. The concept of "selecting an icon" described in the claims includes both of placing an icon in the focus state on a screen described in the embodiment and inputting a determination operation for an icon in the focus state in the embodiment.

EXPLANATION OF REFERENCE NUMERALS 100 multimedia playback system
102 managing server
200 game console
274 related information acquisition unit
276 new information acquisition unit
278 notification acquisition unit
280 content execution unit
286 selected category acquisition unit 288 screen transition control unit
290 display control unit
300 home screen generating unit
310 library screen generating unit
314 related information screen generating unit
316 new information screen generating unit
318 system screen generating unit
324 system function execution screen generating unit
326 notification viewing screen generating unit

INDUSTRIAL APPLICABILITY

The present invention is applicable to an information processing apparatus that displays a screen relating to electronic content.

The invention claimed is:

1. An information processing apparatus, comprising:
a storage unit configured to store a plurality of icons representing a plurality of items of content;
a screen generating unit configured to generate a selection screen for allowing a user to select a desired item of content from among a plurality of items of content, the selection screen having the plurality of icons arranged in a given content area and having information relating to the content arranged in an information area different from the content area; and
a display control unit configured to display the screen generated by the screen generating unit, wherein
the number of icons displayed simultaneously on the selection screen is limited to a given number,
the screen generating unit further arranges a search icon on the selection screen,
in a case where the search icon is selected on the selection screen, the screen generating unit generates a search screen for allowing the user to select a desired item of content from among the plurality of items of content, the search screen not including the information area and simultaneously displaying the plurality of icons greater in number than the given number,
the screen generating unit arranges the plurality of icons side by side in a column in the content area of the selection screen, and
the screen generating unit arranges the plurality of icons in a plurality of columns on the search screen,
wherein while, on one hand, arranging, in the order of most to least recent access to the content by the user, the plurality of icons representing the plurality of items of content side by side in the content area of the selection screen, the screen generating unit arranges the plurality of icons in accordance with a criterion selected by the user from among the plurality of criteria in the search screen.

2. The information processing apparatus of claim 1, wherein the screen generating unit arranges, in the information area of the selection screen, information relating to the content represented by the icon focused in the content area of the selection screen.

3. The information processing apparatus of claim 1, wherein the screen generating unit arranges, in the order of most to least recent access to the content by the user, the plurality of icons representing the plurality of items of content side by side in the content area of the selection screen and arranges the search icon at an end of a column in which the plurality of icons are arranged.

4. The information processing apparatus of claim 1, wherein
the selection screen includes a list in which the plurality of icons are arranged, and
the screen generating unit arranges the search icon at a predetermined position in the list.

5. The information processing apparatus of claim 4, wherein the screen generating unit arranges the search icon at an end of the list.

6. The information processing apparatus of claim 1, wherein
the selection screen includes a list in which the plurality of icons are arranged, and
the screen generating unit further arranges a new information icon for displaying new information at a predetermined position in the list.

7. The information processing apparatus of claim 6, wherein the screen generating unit arranges the new information icon at the end of the list.

8. The information processing apparatus of claim 1, wherein
the selection screen includes a list in which the plurality of icons are arranged,
the storage unit further stores icons representing applications, and
the screen generating unit arranges, in the order of most to least recent access to the content or the applications by the user, both the icons representing the content and the icons representing the applications side by side in the list.

9. An information processing method, comprising the steps of, by an information processing apparatus:
generating a selection screen for allowing a user to select a desired item of content from among a plurality of items of content, the selection screen having the plurality of icons arranged in a given content area and having information relating to the content arranged in an information area different from the content area; and
displaying the screen generated by the generating step, wherein
the number of icons displayed simultaneously on the selection screen is limited to a given number,
the generating step further arranges a search icon on the selection screen,
in a case where the search icon is selected on the selection screen, the generating step generates a search screen for allowing the user to select a desired item of content from among the plurality of items of content, the search screen not including the information area and simultaneously displaying the plurality of icons greater in number than the given number,
the generation step includes arranging the plurality of icons side by side in a column in the content area of the selection screen, and
the generation step includes arranging the plurality of icons in a plurality of columns on the search screen,
wherein while, on one hand, arranging, in the order of most to least recent access to the content by the user, the plurality of icons representing the plurality of items of content side by side in the content area of the selection screen, the generating arranges the plurality of icons in accordance with a criterion selected by the user from among the plurality of criteria in the search screen.

10. A computer program causing a computer to implement functions of:

generating a selection screen for allowing a user to select a desired item of content from among a plurality of items of content, the selection screen having the plurality of icons arranged in a given content area and having information relating to the content arranged in an information area different from the content area; and displaying the screen generated by the function of generating, wherein the number of icons displayed simultaneously on the selection screen is limited to a given number, the function of generating further arranges a search icon on the selection screen, in a case where the search icon is selected on selection screen, the function of generating generates a search screen for allowing the user to select a desired item of content from among the plurality items content, the search screen not including the information area and simultaneously displaying the plurality of icons greater in number than the given number, the generation step includes arranging the plurality of icons side by side in a column in the content area of the selection screen, and the generation step includes arranging the plurality of icons in a plurality of columns on the search screen, wherein while, on one hand, arranging, in the order of most to least recent access to the content by the user, the plurality of icons representing the plurality of items of content side by side in the content area of the selection screen, the generating arranges the plurality of icons in accordance with a criterion selected by the user from among the plurality of criteria in the search screen.

\* \* \* \* \*